US011256639B2

(12) United States Patent
Regupathy et al.

(10) Patent No.: US 11,256,639 B2
(45) Date of Patent: Feb. 22, 2022

(54) METHOD, APPARATUS, SYSTEM TO ENHANCE THE DEVICE POLICY MANAGER (DPM) TO MANAGE AN EXPENDED USB-C ECOSYSTEM

(71) Applicant: Intel Corporation, Santa Clara, CA (US)

(72) Inventors: Rajaram Regupathy, Bangalore (IN); Abdul R. Ismail, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 973 days.

(21) Appl. No.: 15/791,182

(22) Filed: Oct. 23, 2017

(65) Prior Publication Data
US 2019/0121764 A1 Apr. 25, 2019

(51) Int. Cl.
*G06F 13/40* (2006.01)
*G06F 13/42* (2006.01)
*G06F 1/26* (2006.01)
*G06F 13/362* (2006.01)
*H04L 41/12* (2022.01)
*H04L 41/0893* (2022.01)
*H04L 41/0853* (2022.01)
*H04L 41/0806* (2022.01)

(52) U.S. Cl.
CPC .............. *G06F 13/362* (2013.01); *G06F 1/26* (2013.01); *G06F 13/4045* (2013.01); *G06F 13/4068* (2013.01); *G06F 13/4282* (2013.01); *H04L 41/0853* (2013.01); *H04L 41/0893* (2013.01); *H04L 41/12* (2013.01); *G06F 2213/0042* (2013.01); *H04L 41/0806* (2013.01)

(58) Field of Classification Search
CPC ..... G06F 13/4045; G06F 13/4282; G06F 1/26
See application file for complete search history.

(56) References Cited

U.S. PATENT DOCUMENTS

2013/0246663 A1* 9/2013 Raveendran .......... G06F 9/4411
710/8

OTHER PUBLICATIONS

IEEE P802.11ah/D5.0: "Part 11: Wireless LAN Medium Access Control (MAC) and Physical Layer (PHY) Specifications, Amendment 2: Sub 1 GHz License Exempt Operation," IEEE Draft Standard for Information technology—Telecommunications and information exchange between systems, Local and metropolitan area networks—Specific requirements, Mar. 2015, 632 pages.
IEEE Std 802.11-2012: "Part 11: Wireless LAN Medium Access Control (MAC) and Physical Layer (PHY) Specifications," IEEE Standard for Information technology—Telecommunications and information exchange between systems, Local and metropolitan area networks—Specific requirements, Mar. 29, 2012, 2793 pages.

(Continued)

*Primary Examiner* — Zachary K Huson
(74) *Attorney, Agent, or Firm* — Nicholson, De Vos, Webster & Elliott, LLP

(57) ABSTRACT

A method and a device to participate in a managed Universal Serial Bus (USB) ecosystem. The method including establishing a connection with a plurality of devices in the ecosystem as a many-to-many relationship between extended USB device policy managers, and coordinating power and data exchange within the plurality of devices the ecosystem including at least one device that is not directly connected.

19 Claims, 15 Drawing Sheets

(56) References Cited

OTHER PUBLICATIONS

IEEE Std 802.11a-1999(R2003): "Part 11: Wireless LAN Medium Access Control (MAC) and Physical Layer (PHY) Specifications, High-speed Physical Layer in the 5 GHz Band," IEEE Standard for Information technology—Telecommunications and information exchange between systems, Local and metropolitan area networks—Specific requirements, reaffirmed Jun. 12, 2003, copyright 1999, 91 pages.

IEEE Std 802.11ac-2013 "Part 11: Wireless LAN Medium Access Control (MAC) and Physical Layer (PHY) Specifications, Amendment 4: Enhancements for Very High Throughput for Operation in Bands below 6 GHz," IEEE Standard for Information technology—Telecommunications and information exchange between systems, Local and metropolitan area networks—Specific requirements, Dec. 18, 2013, 425 pages.

IEEE Std. 802.11b-1999: "Higher Speed Physical Layer (PHY) Extension in the 2.4 GHz Band," IEEE Standard for Information Technology, Telecommunications and information exchange between systems, Local and Metropolitan networks, Specific requirements, Part 11: Wireless LAN Medium Access Control (MAC) and Physical Layer (PHY) specifications, Sep. 16, 1999, 96 pages.

IEEE Std 802.11g-2003: "Part 11: Wireless LAN Medium Access Control (MAC) and Physical Layer (PHY) Specifications, Amendment 4: Further Higher Data Rate Extension in the 2.4 GHz Band," IEEE Standard for Information technology—Telecommunications and information exchange between systems, Local and metropolitan area networks—Specific requirements, Jun. 27, 2003, 78 pages.

IEEE Std 802.11n-2009: "Part 11: Wireless LAN Medium Access Control (MAC) and Physical Layer (PHY) Specifications, Amendment 5: Enhancements for Higher Throughput," IEEE Standard for Information technology—Telecommunications and information exchange between systems, Local and metropolitan area networks—Specific requirements, Oct. 29, 2009, 536 pages.

JEDEC Standard, "Low Power Double Data Rate 2 (LPDDR2)," JESD209-2E (Revision of JESD209-2D, Dec. 2010), JEDEC Solid State Technology Association, Apr. 2011, 284 pages.

PCI Express® Base Specification Revision 3.0, Nov. 10, 2010, 860 pages.

TPM Main Part 1 "Design Principles," Specification Version 1.2, Revision 62, TCG Copyright, Oct. 2, 2003, 161 pages.

TPM Main Part 2 "TPM Structures," Specification Version 1.2, Revision 62, TCG Published, Oct. 2, 2003, 176 pages.

"Universal Serial Bus Power Delivery Specification," Revision 3.0, V1.0a, ECNs, Aug. 2, 2016, 528 pages.

"Universal Serial Bus Power Delivery Specification," Revision 3.0, V1.1, Jan. 12, 2017, 579 pages.

"Universal Serial Bus Type-C Cable and Connector Specification," Release 1.2, Mar. 25, 2016, 221 pages.

"Universal Serial Bus Type-C Cable and Connector Specification," Release 1.3, Jul. 14, 2017, 241 pages.

Wigig White Paper, Wireless Gigabit Alliance, Defining the Future of Multi-Gigabit Wireless Communications, Jul. 2010, 5 pages.

* cited by examiner

METHOD, APPARATUS, SYSTEM TO ENHANCE THE DEVICE POLICY MANAGER (DPM) TO MANAGE AN EXPENDED USB-C ECOSYSTEM

TECHNICAL FIELD

Embodiments of the invention relate to the field of Universal Serial Bus (USB) operation; and more specifically, to the operation of device policy managers to enable an extended USB ecosystem.

BACKGROUND

The Universal Serial Bus (USB) standard is a standard that defines cables, connections and communication protocols used for connection, communication and power supply between electronic devices. The USB standard has evolved over time to utilize various connector types and support varying features. Amongst these USB standards is the USB Type-C (herein USB-C) standard that defines a reversible plug connector for USB devices. The Type-C plug connects to electronic devices that function as both hosts and connected devices.

Connecting an electronic device to a host device such as computing system having a motherboard, central processing unit (CPU) and similar components encompasses having circuitry that detects the connection of the electronic device. Where a device is connected via a USB-C connector port, there is circuitry that detects the connection of a cable and electronic device to the connector port. This enables the software and circuitry that manage the USB communication protocols to initiate communication and power controls for the connected device.

The USB port, which used to be primarily for data transfer and low power devices has evolved to add capabilities of up to 100 Watts. USB has been augmented to support different protocols and high-speed data using a USB port typed called the USB-C type port. These new capabilities of USB and the USB ports are defined through updated specifications including the USB-C Cable and Connector Specification 1.3 and USB Power Delivery (PD) Specification 3.0. Additional functions referred as "Alternate Modes" like DisplayPorts, HDMI, Thunderbolt, Peripheral Component Interconnect (PCI), and similar technologies can be supported over USB-C ports as defined by the respective organizations on how to use available USB-C ports for the respective functionalities. These upgrades to USB however do not change the basic point-to-point nature of USB connections, whereby, each device operates in a one-to-one relationship with the device connected to it.

BRIEF DESCRIPTION OF THE DRAWINGS

The present disclosure is illustrated by way of example and not limitation in the figures of the accompanying drawings, in which like references indicate similar elements and in which.

DETAILED DESCRIPTION

Figure 1:
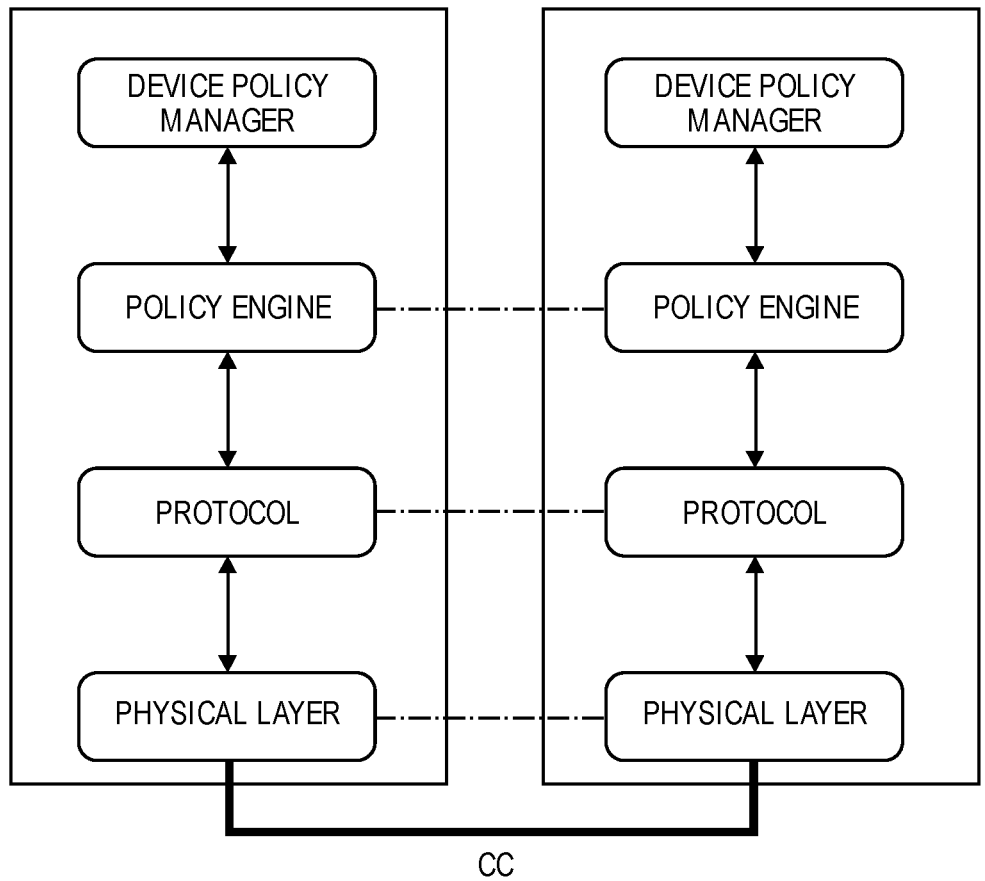
FIG. 1 is a diagram of one embodiment of the Universal Serial Bus point to point connection.
Figure 1:
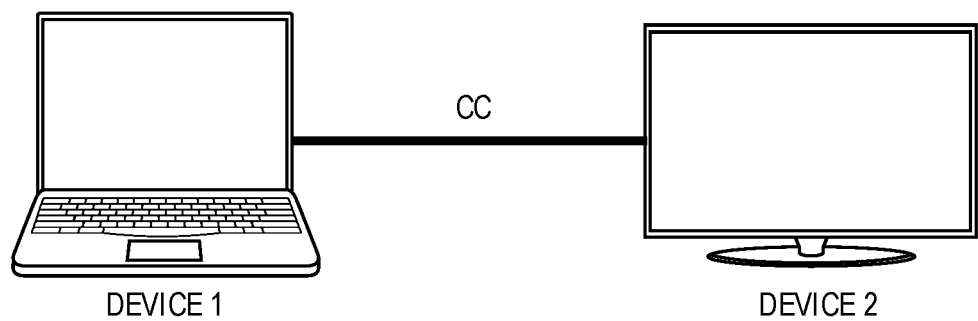

The embodiments encompass a system and method for expanding the Universal Serial Bus (USB) ecosystem. USB connections are point to point and plug and play. The device policy manager (DPM) for USB is designed for these basic one-to-one relationships between devices. The embodiments provide an extended DPM (eDPM) to enable expanded ecosystem configuration to overcome the limitations of the point to point, plug and play DPM that cannot fully take the advantage of the possible power and functionality of USB-C thus limiting user experience and power conservation. The embodiments extend the DPM by using a secondary communication mechanism, such as a wireless medium, which is used to handle the plug and play and to expand the peer to peer connections to a one to many relationship at the DPM level, which builds USB ecosystem knowledge, and enables expanded control power and functions.

In the following description, numerous specific details are set forth. However, it is understood that embodiments of the disclosure may be practiced without these specific details. In other instances, well-known circuits, structures, and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Electronics (e.g., computing systems) generally employ one or more electrical connections (e.g., wired or wireless connections) to facilitate the transmission and reception of data (e.g., communication) between devices, such as, but not limited to, between a computing system (e.g., a computer including a hardware processor) and a (e.g., external) peripheral. Non-limiting examples of peripherals are external storage devices (e.g., hard disk drives) and mobile devices (e.g., smartphones and tablets).

Certain electrical connections (e.g., couplings) include parallel conductors (e.g., parallel wires or other electrically conductive paths). One embodiment of an electrical connection is a bus. One embodiment of a bus is a multiple conductor bus, for example, where the conductors (e.g., wires) allow parallel (e.g., concurrent) transmittal of data thereon. The term electrical connection (e.g., bus) may generally refer to one or more separate physical connections, communication lines and/or interfaces, shared connections, and/or point-to-point connections, which may be connected by appropriate bridges, hubs, adapters, and/or controllers. A serial bus (e.g., serial bus architecture) may generally refer to a (e.g., shared) communication channel that transmits data one bit after another (e.g., sequentially), for example, over a (e.g., each) single wire or fiber.

The phrase Universal Serial Bus (USB) generally refers to a specification(s) for a serial bus that supports the transmission and reception of data (e.g., and power and/or control) between a downstream facing port (e.g., a host) and a one or more upstream facing ports (e.g., devices), for example, through one or more hubs there between.

In certain embodiments, a first device may connect to a second device through a (e.g., wired) electrical connection, for example, a serial bus cable having multiple conductors (e.g., wires). A cable may include a plug, e.g., on each end thereof. A receptacle of a device (or a plug of a device) may receive a plug (or receptacle) coupled to another device. In one embodiment, a plug may be received (e.g., inserted) into a receptacle in a plurality of orientations, for example, flipped from one orientation to another orientation, e.g., and retain its (e.g., full) functions. This may be referred to as "flip-ability", e.g., flip-able between a right-side up position and an upside-down position.

Certain embodiments (for example, with one or more flip-able plug and receptacle pairs) may allow a first device and/or a second device to toggle between different roles, for example, as the devices wait for a physical connection to be made and each device's role to be established, e.g., in contrast to a connector's type defining a role, such as a Type-A USB connector being a host (data master) role and a Type-B USB connector being a slave (data recipient) role. In certain embodiments herein, a first device may be in a first role (e.g., an upstream facing data port role, downstream facing data port role, power source role, and/or power sink role) and a second device in a second (e.g., same or different than the first) role (e.g., an upstream facing data port role, downstream facing data port role, power source role, and/or power sink role). In one embodiment, a device (e.g., a circuit thereof) presents itself (e.g., during initial attachment) as a first of a plurality of roles, then changes to a second of a plurality of roles, etc. In one embodiment, a device (e.g., a circuit thereof) presents itself (e.g., during initial attachment) as a first role, then toggles to a second role, then back to the first role, for example, and continues to do so, e.g., until the other device acknowledges that role (e.g., via an acknowledgement signal). For example, a current USB-C Cable and Connector Specification (e.g., revision 1.3 of Jul. 14, 2017) and a current USB Power Delivery specification (e.g., revision 3.0, version 1.1 of Jan. 12, 2017) includes an upstream facing data port role (e.g., a host) and a downstream facing data port role for each device (e.g., a USB device) and/or a power source role and a power sink role. In one embodiment, a device in the power source role (e.g., that acquires the power source role) is also in the downstream facing data port role, for example, until an operation is performed to swap one or more of the device's roles (e.g., to perform a power role swap to swap the current power role but retain the current data role, to perform a data role swap to swap the current data role but retain the current power role, or to perform a role swap of both the data and power roles). In one embodiment, a device in the power sink role (e.g., that acquires the power sink role) is also in the upstream facing data port role, for example, until an operation is performed to swap one or more of the device's roles (e.g., to perform a power role swap to swap the current power role but retain the current data role, to perform a data role swap to swap the current data role but retain the current power role, or to perform a role swap of both the data and power roles).

In certain embodiments, a first device with multiple (e.g., dual) roles may connect to a second device with multiple (e.g., dual) roles (for example, where each device's role is not defined by the connector (e.g., a plug or receptacle thereof) type, e.g., two devices connected by a cable that has the same plug at each end). In embodiments, each device may present itself in the same role, for example, where the devices do not connect to each other, e.g., do not connect from a user's perspective or with respect to a communication protocol (for example, electrically and/or physically connected devices that do not allow data and/or power transmission or reception, e.g., other than communications to define a device's role). Certain devices (e.g., operating according to specification(s) or industry standards) do not have predefined roles, for example, each device is to establish its role, for example, or it does not function, e.g., to transmit and receive data and/or source and sink power. Certain devices (e.g., operating according to specification(s) or industry standards) do not define device role(s), for example, in the point-to-point connection by the connector type, e.g., to accept and provide power and/or data with an externally connected device (e.g., a laptop connected to phone, a laptop connected to an external (e.g., USB drive), a phone connected to tablet, etc.).

For example, each device of a plurality of devices may include a same connector (e.g., plug or receptacle thereof), for example, such that circuitry is to cause signaling (e.g., between connected devices) while the connections are physically made (e.g., during an initialization phase) in order to define the role(s) of each device, for example, one device as a host and another device as a slave and/or one device as a power source (e.g., provider) and another device as the power sink (e.g., consumer). In certain embodiments, devices that toggle (e.g., switch) between either of a plurality of roles (e.g., a dual role device) are to toggle (e.g., via a toggling circuit) back and forth between a plurality of roles, for example, (e.g., only) between an upstream facing data port role (e.g., slave or device role) and a downstream facing data port role (e.g., host role). Device(s) may toggle between a plurality of roles until a specific (e.g., stable) state is established, for example, during a connection process (e.g., initial attach). A multiple (e.g., dual) role device may connect to a fixed role device or another multiple (e.g., dual) role device. In one embodiment, both devices are capable of the same (e.g., pair of) roles. In one embodiment, both multiple (e.g., dual) role devices (e.g., the ports thereof) are toggling between a first role and a second role (for example, via one or more of each device's configuration channels (e.g., each device's CC1 and CC2 pins)) at (e.g., substantially) the same frequency (e.g., time rate) and/or duty cycle. Thus, in certain embodiments, a physical connection is made (e.g., with a USB-C cable) between two or more multiple role devices but none of the devices detects the signaling to define a role (e.g., no device detects a signaling event or sends a response to acknowledge the signaling event).

Certain embodiments herein provide for a randomization of one or both of multiple role device's toggling frequency and its toggling duty cycle, for example, to minimize the probability of in sync toggling. Certain embodiments herein provide for a randomization of one or both of multiple role device's toggling frequency and its duty cycle during each cycle of toggling between different device roles. Certain embodiments herein randomize a multiple (e.g., dual) role device's toggling frequency and duty cycle, e.g., to vary the high and low times of the toggling, to reduce or eliminate the possibility of two (e.g., unique) separate devices having the same timings, e.g., over a plurality of cycles. Certain embodiments herein provide for one or more multiple (e.g., dual) role devices connected together to resolve their upstream facing data port role and downstream facing data port role and/or their power source role and power sink role faster than without randomization, e.g., as the likelihood all (e.g., both) devices are asserting (e.g., displaying) the same role at the same time is reduced (e.g., lower) or eliminated. Certain embodiments herein add more randomization to the toggling frequency and/or duty cycle of a device asserting each role indicator than a device with a fixed duty cycle and/or frequency of toggling, e.g., more randomization than a substantially fixed toggling duty cycle and/or a substantially fixed frequency of toggling that rely only on the inaccuracy (e.g., according to manufacturing tolerances) of internal timers or oscillators to provide variance (e.g., misalignment) to resolve roles and avoid the case where the toggling is in sync. Certain embodiments herein reduce role resolution times as well as reduce or avoid any occurrences where neither device sees the role defining event (e.g., a cable and/or plug insertion event). Certain embodiments herein reduce (e.g., to the end user) the resolution time significantly, e.g., the overall time from connection of the devices to usability (e.g., to allow payload data to be transmitted and received, e.g., and not role merely role resolution data transmission and receipt) is shorter.

FIG. 1 is a diagram of one embodiment of the Universal Serial Bus point to point connection. The diagram illustrates a logical architecture of an USB-Type-C/USB PD solution as defined by the USB PD specification. The Device Policy Manager (DPM) is an independent entity specific to its associated device and there is no logical connection between two DPMs when there is a connection between their respective devices. As mentioned above, the connection between the two devices is point to point or one to one, as with a traditional USB connection.

The diagram of FIG. 1 is one example representation of the different layers of a connected USB-C/USB PD devices. The DPM of each device communicates with its respective port through the layers of the USB-C specification. The USB-PD specification defines a policy engine, protocol layer and physical layer. The physical layer encompasses the physical medium of communication between the port and the DPM as well as low level communication related to power delivery such as the configuration of resistance levels (e.g., Rp and Rd) on the physical medium. The protocol layer defines messaging between the port and the DPM that enables the DPM to negotiate allotted power levels for the devices attached to the port. The policy engine implements basic USB-PD management specific to the corresponding port.

The DPM controls the allotment and management of power across the available ports in the system. The DPM is the brains of the USB-C subsystem which handles management of the power role, power policy, multiple port monitoring and power requirements balancing across the available ports. The DPM monitors batteries and AC power supplies and manages alternate modes of operation. Thus, in a USB-C architecture, the DPM can manager connection/disconnection, power distribution or enabling functionalities and can be controlled and managed by a software module.

Another feature in the USB ecosystem is that the USB specifications define USB-C cables with integrated electronics to communicate cable capabilities and perform signal conditioning referred as "Active Cable" technology. These USB-C active cables can be of length greater (up to 50 m) than the standard length of 5 meters for prior types of USB cables. This presents many new possible data/video intensive technologies and applications beyond the PC centric technologies and applications. With such diverse capability of power, data and video along with standardized USB-C cables, USB-C technology will expand to new ecosystems which legacy USB did not support or enable. The embodiments support these new ecosystems which USB-C/USB PD technologies will expand into.

In a USB-C ecosystem, the connection and enumeration of a USB device is divided between the USB-C/USB PD subsystems and the USB functional subsystem. The USB-C subsystem is responsible for connect/disconnect and managing power. After successful connection and power negotiation the functional aspects of USB like enumeration and USB device functionality (e.g., data transfer) is started.

Figure 2:
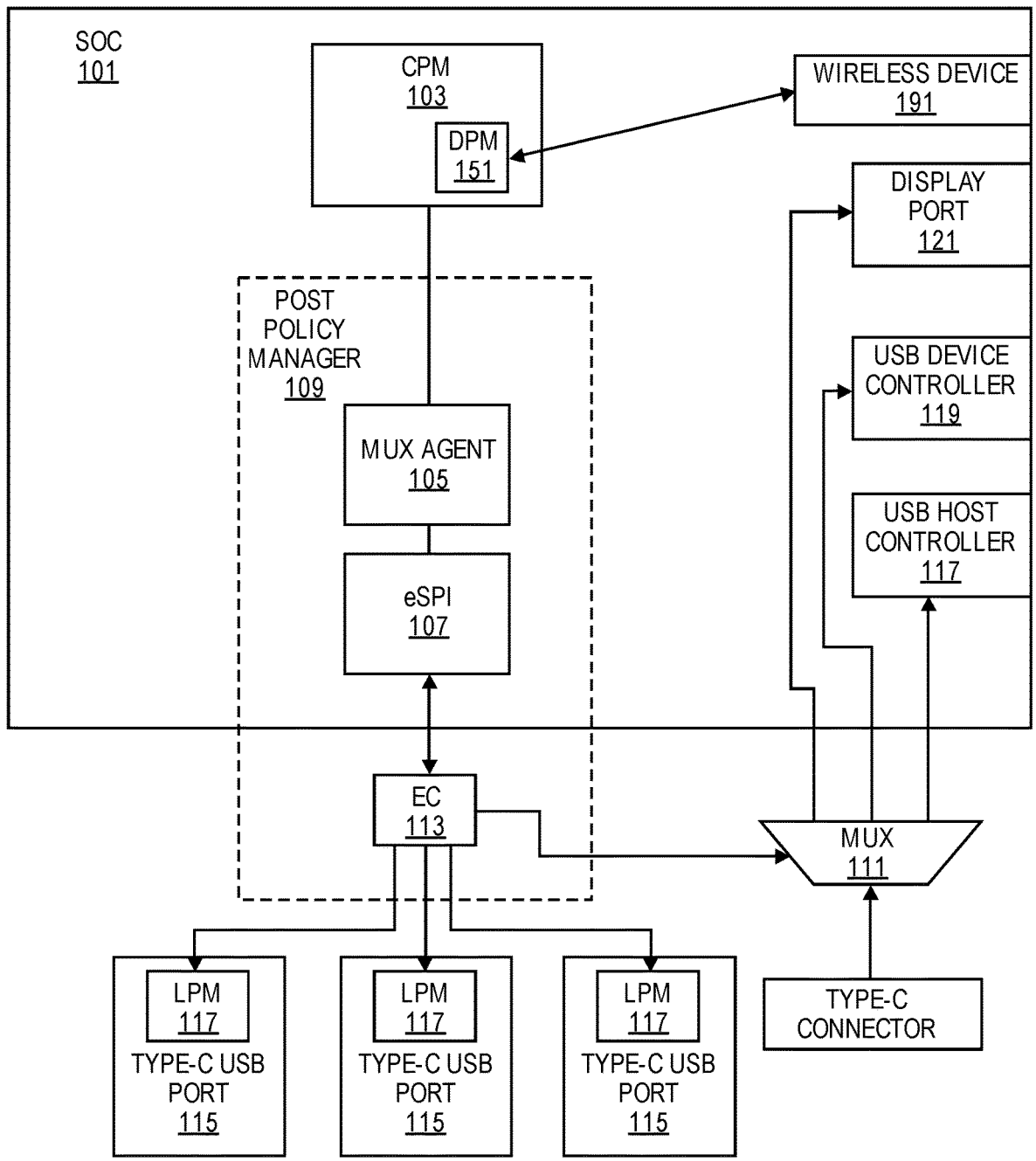
FIG. 2 is a diagram of one embodiment of the USB architecture.

FIG. 2 is a diagram of one embodiment of a computing system with an architecture with USB components on the motherboard. The computing system is illustrated with abstraction to show those components relevant to the processes for handling USB-C connections.

The example system includes a system on a chip (SOC) 101 that includes a processor or set of processors and internal interconnects. In other embodiments, the system may not be structured as a SOC and may instead have separate processor and chipset components. One skilled in the art would understand that the principles, structures and processes described herein with relation to a SOC architecture, which is provided by way of example and not limitation, would also apply to other computer architectures.

The processors of the SOC execute an operating system (OS) policy manager (OPM) 103 that communicates OS based requests to the USB-C connector/device and receives the same. The OPM 103 is in communication with the platform policy manager (PPM) 109, which manages USB-C ports of the computer system and applies system and power delivery policies. The OPM 103 can include a DPM that specifically manages the power allotment to connected devices in coordination with other components including the PPM and the link policy managers (LPMs) 117. The OPM 103 also includes a USB bus driver 171 that manages the enumeration of USB devices and other functions of USB communication. The USB bus driver 171 can include a DPM extension (eDPM) that communicates and has a logical one to many relationship with other eDPM in a USB ecosystem. In some embodiments, the eDPM communicates via a wireless device 191 with the other eDPM in the USB ecosystem. The eDPM can use any communication protocol or medium to make this connection and exchange information with other eDPM including use of WiFi, Bluetooth or similar communication technologies.

The PPM 109 includes a multiplexor (mux) agent 105 that manages the communication with a discrete external multiplexor 111 to enable a display port 121, USB device controller 119 and USB host controller 117 to communicate with a set of Type-C USB ports 115 via an embedded controller (EC) 213. The computing system in which a set of Type-C ports or connectors 115 are present may include any number of such ports or connectors. However, in some embodiments, an EC can only connect with four connectors, where there are four or more connectors, the external multiplexor 111 is utilized. In further embodiments, other mechanisms such as an infrastructure engine may manage communication and routing of communication with the USB ports.

The PPM includes an enhance serial peripheral interconnect (eSPI) that manages port status communication messages between the ports or connectors 115 and the PPM 109. Each of the ports may implement a LPM 117 that manages status information at the port that can be retrieved by the EC. The mux agent 105 communicates via eSPI with the external multiplexor 111.

The display port 121 is a component for managing communication with an external monitor that may be connected to a given Type-C port or connector 115. A USB device controller 119 and USB host controller 117 manage general USB compliant communication where the computing system functions as a device or host, respectively. Each of these functions must be supported for each Type-C connector or port.

Figure 3:
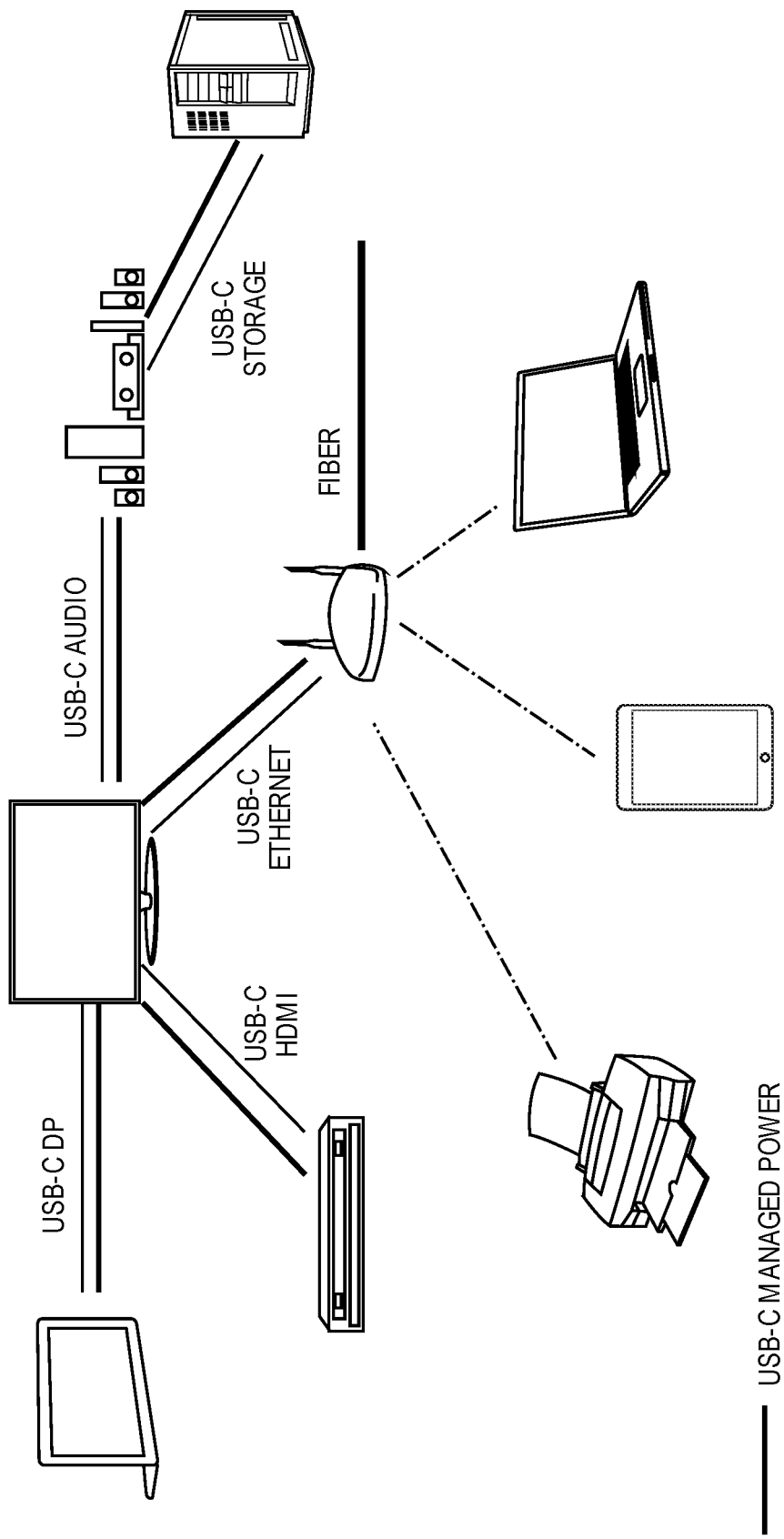
FIG. 3 is a diagram of one example embodiment of a USB ecosystem.

FIG. 3 is a diagram of an example USB ecosystem. A USB ecosystem may use any number of cables to push data, video and power between any number of interconnected devices using various technologies. The different devices in the ecosystem like the display units, servers, routers and other devices may be permanently or temporarily interconnected and can be spread across a room or over a greater geographical area.

If the USB ecosystem does not employ USB-C, then the wiring complexity of the connections prevents the devices from being completely powered down and can lead to unnecessary power wastage. In USB-C ecosystems, USB PD can facilitate better port and broadcasting management in the USB ecosystem. Absent the embodiments herein, the problem of power wastage would remain in the USB-C/USB PD environment as well due to the plug and play and point to point nature of the DPM.

Additional problems also arise due to the fact the USB-C port supports multiple functionalities and the DPM needs to select the functionality the USB ecosystem needs. For example, it would be difficult to setup a display unit to the existing USB ecosystem's needs every time manually. Thus, a problem of choosing functionality and conserving power remains with a plug and play and point to point DPM in a complex USB ecosystem.

Returning to the example of FIG. 3, the USB-C ecosystem can be applied to a home network environment. In this example context, the constituent electronic devices use multiple technologies to form a connected home with wires running across the house (in some cases within walls much like Ethernet wired homes). The USB-C/USB PD can replace all the prior technologies with the help of the "active cable" definition. In this setup, some devices, like a storage server, may be in the first floor of a home and other devices in another floor or room. When a user needs to use these remotely located devices some effort is required to power everything up and bring the setup to life, as each intermediate device must be powered on to enable communication across multiple devices. Hence, generally these devices remain powered leading to unnecessary power loss/use. The problem remains even when these ecosystems adopt USB-C/USB PD, because of the plug and play and point to point nature of the DPM definition which is the default implementation in these devices.

From the above examples, it can be seen that a DPM defined for traditional USB ecosystems does not best utilize and support the USB-C ecosystems and does not take full advantage of the potential software controlled power and data via USB-C/USB PD. These limitations are largely tied to the limitation that USB connections are point to point (one to one) and plug and play. The DPM is designed for simple USB systems and is inadequate when used in a USB-C ecosystem, which limits the capability of the USB-C ecosystems and increases the manual intervention required to avoid wasting power in unattended devices. A point to point, plug and play DPM cannot fully take the advantage of software managed power and functionality of USB-C thus limiting user experience and power conservation.

The embodiments overcome these limitations by extending the DPM to support communication with other devices (and their DPM) outside the device using a secondary, out of band communication medium (e.g., a wireless medium), which controls the plug and play (e.g., to a connection switch ON and OFF) and to expand the peer to peer connection to a one to many at DPM level, which includes building the USB ecosystem knowledge, and to control power and similar functions. To achieve the above objectives, each device (via their respective extended DPM (eDPM)) advertises the device USB capabilities, creates an authenticated session with a master device for the USB ecosystem before establishing a point to point contract with physically plugged device. This method allows the USB ecosystem to centrally control the connection/disconnection, power sharing on USB-C ports and the choice of functionality to be made available on a given USB-C port. The embodiments enable a USB port to push failure notification (OC/OV, Contract Failure, or similar notifications) over the secondary communication medium and to monitor port status remotely over the secondary communication medium.

In a given USB ecosystem, there can be single master or host eDPM or alternately a set of such masters that coordinate amongst themselves, that establishes communication sessions with each of the other devices in the USB ecosystem and manages data connection, power allocation and other USB functionalities in the USB ecosystem. The embodiments also supports an entity outside the USB ecosystem to function as the master (e.g., a mobile) of the wireless session. The external entity doesn't have to implement the USB-C/USB PD stack but implements a System Policy Manger and part of an extended Device Policy Manager to manage the USB ecosystem.

In one example, a streaming device may be connected to a HDMI port of a display unit or a USB-C port. The streaming device is powered via a USB charger or via the USB-C Port. The streaming device can be always powered irrespective of the attached display unit's standby state. With the embodiments, the streaming device or the display unit's USB port can be remotely managed to get a connect/disconnect notification and can manage power to the streaming device thus conserving power when not in use. With the embodiments, the same power can then instead be provided to another device like a handheld device which is power hungry in order to charge the battery. If the streaming device used 2.5 W of power, this can be a net savings of 2.5 W or a repurposing of the 2.5 W to more quickly charge another device.

In a similar example, a home network or USB ecosystem similar to that shown in FIG. 3 can include media servers, media players, A/V switch leading to different rooms of the home, routers, printers, mobile devices, computers, display devices and similar electronic devices using a USB connection to communicate with one another. Most of these devices will not be of powered off due to accessibility requirements, thus leading to power dissipation. When the devices in this setup are centrally managed via the embodiments, power conservation can be maximized by strategic powering on of the devices as needed for the other devices in the USB ecosystem to function.

As mentioned, employing the USB-C/USB PD ecosystem by itself does not change the problem, which remains due to the one to one DPM relationships and the plug and play functions. A remotely managed USB-C/USB PD DPM in these home automation USB ecosystems will enable easy power ON and OFF as well as select protocol functionality as needed on the port based on the ports operations.

TABLE I

| | With eDPM | DPM |
|---|---|---|
| Home Automation USB ecosystem | Save Power Control the home automation network power and data Collect statistics of usage, failure Ease of use for end user | Power loss due to standby equipment Network with no ability to control power |

Figure 4:
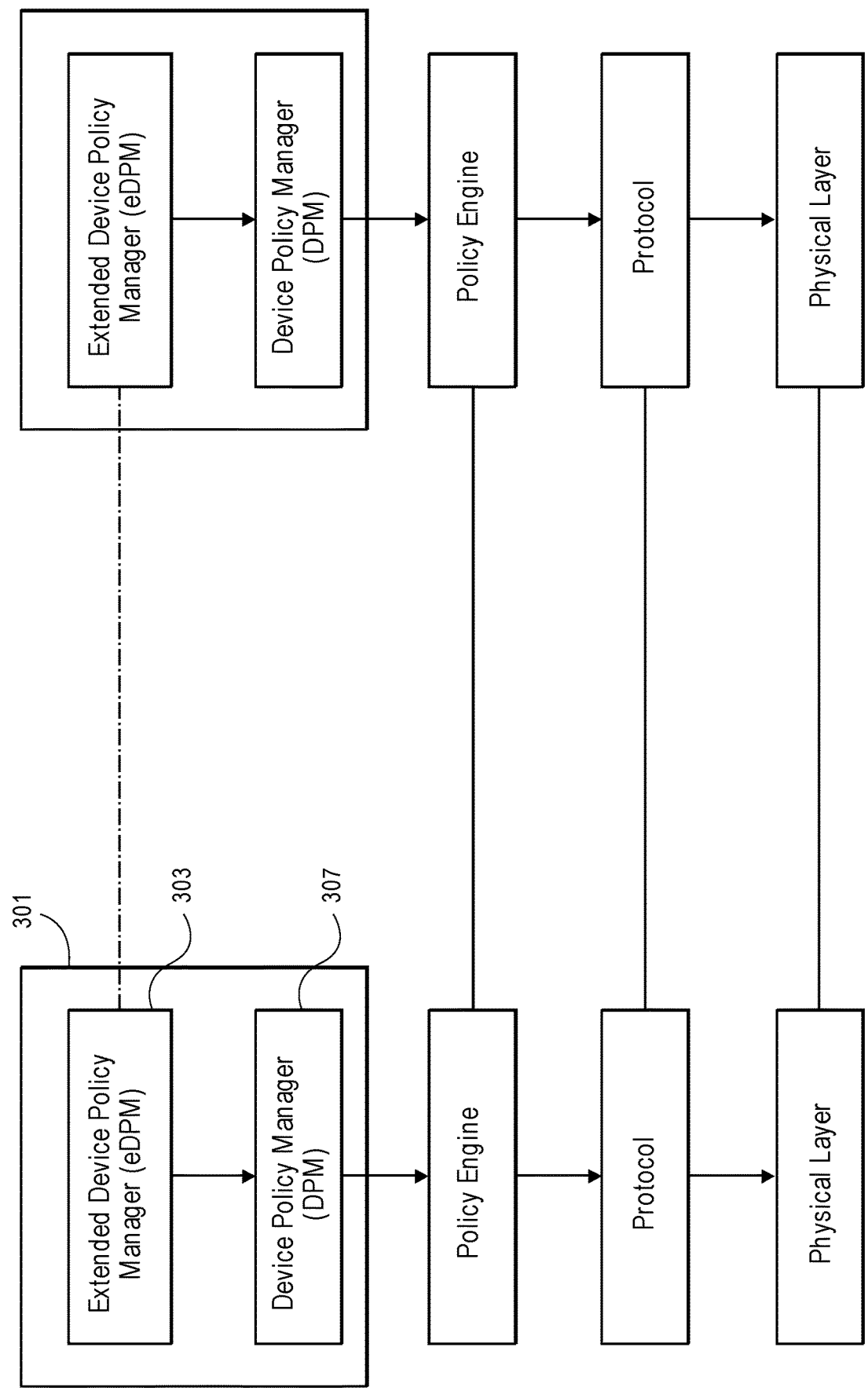
FIG. 4 is a diagram of another example embodiment of a USB ecosystem.

FIG. 4 is a diagram of one embodiment of the DPM having an eDPM component. In the illustrate embodiments, the DPM 301 is divided into two modules namely the base DPM 307 and extended Device Policy Manager (eDPM) 303. In this configuration, the logical connection is established between all the modules of the USB stack. The connection between the DPM/eDPM is a one-to-many relationship and the other modules (Policy Engine, Protocol and Physical layer) are peer-to-peer as defined in the specification. The one-to-many relationship is enabled by use of the second communication medium that enables direct communication between eDPM modules.

Figure 5:
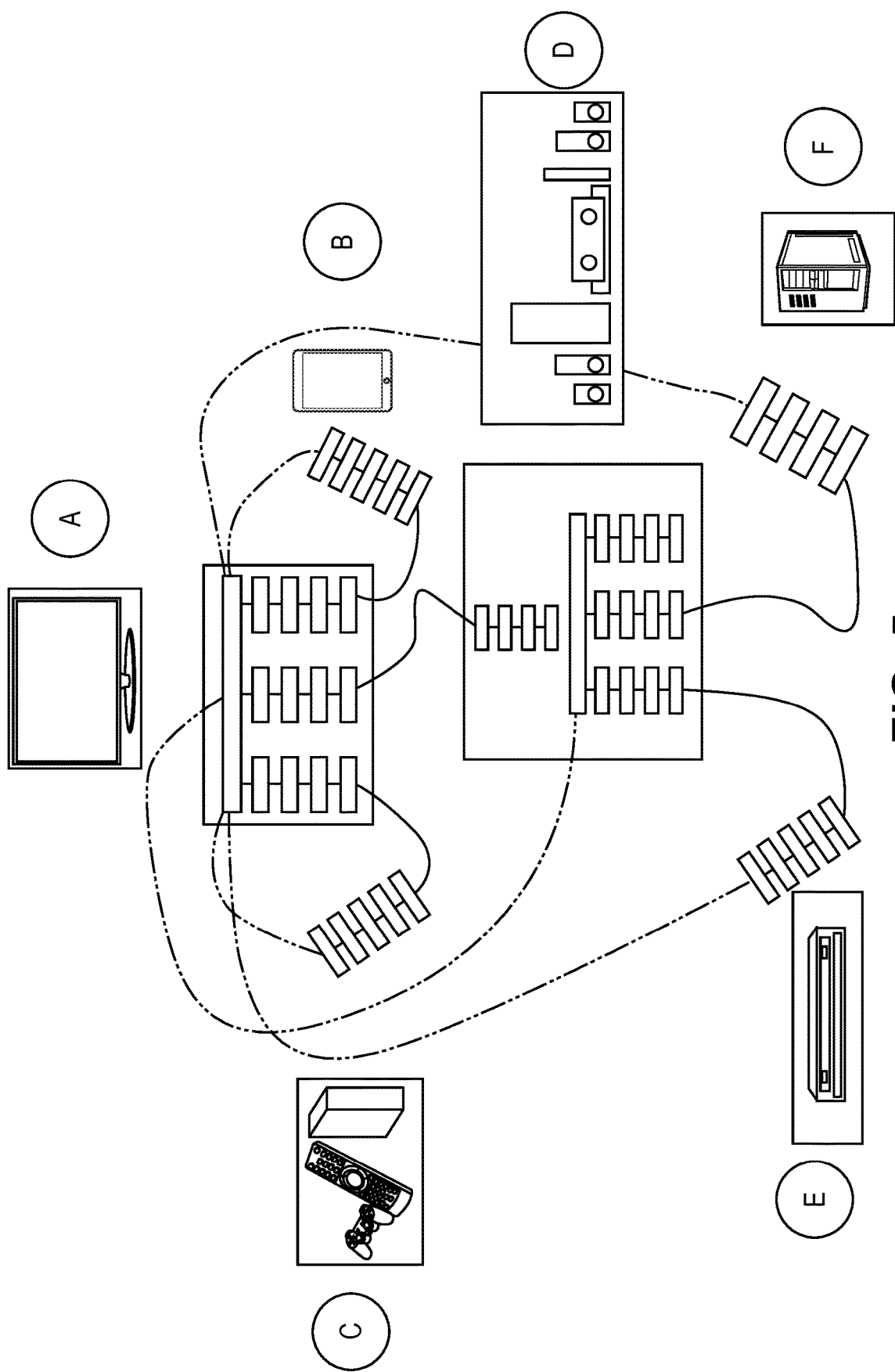
FIG. 5 is a diagram of one example embodiment of an expanded USB ecosystem.

FIG. 5 is a diagram of one embodiment of a home automation setup with an illustration of the USB stacks for each device. In this example, a television (A) which is connected to A/C power and has the ability to power all the other devices in this USB ecosystem. As a first step all the devices in the USB ecosystem advertise their respective presence and their characteristics. In some embodiments, the USB ecosystem may include some devices like (F) that don't have and eDPM. In such cases, it is possible for a connected device (D) to provide an advertisement of the non-supporting device characteristics. The attached device may provide power or other functions to this non-supporting device (F) and directly or indirectly determine the characteristics or requirements of the non-supporting device (F). The advertisements of each device can be flooded or similarly spread throughout the USB ecosystem such that all the eDPM receive all of the available advertisements.

After the advertisements complete, a negotiation may ensure between the devices to determine a master for the USB ecosystem. In one example, at the end of the negotiation the television (A) emerges as the master of the eDPM. This could be decided by power capabilities or by external devices like a remote control or hand-held device as discussed further herein below. In some cases, the handheld or the remote control can act as the master. The master can manage, with help of each eDPM, all devices in the USB ecosystem, enabling all of the devices to be software controlled. This enables remotely powering ON/OFF a device and also choosing the operating mode(s) of each device in the USB ecosystem.

Figure 6:
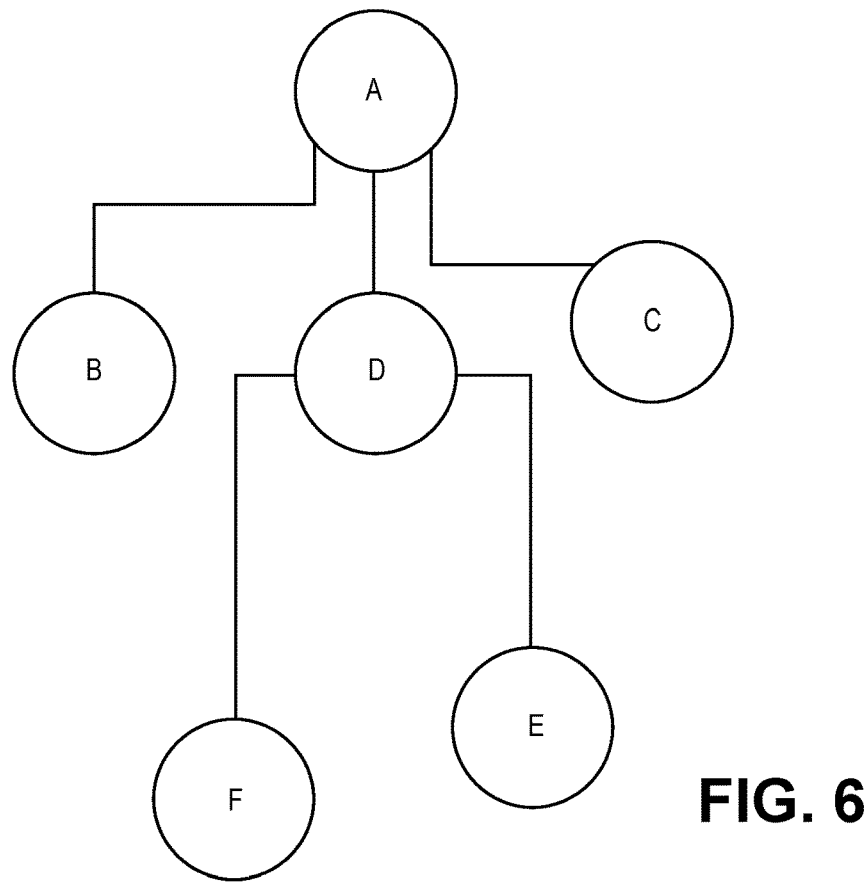
FIG. 6 is a diagram of one embodiment of a USB device hierarchy.

FIG. 6 is a diagram of one embodiment of a hierarchy of a USB ecosystem. The hierarchy shown in FIG. 6 is a representation of the relationships of the USB ecosystem illustrated in FIG. 5. This hierarchy demonstrates the relationships of the member electronic devices as they are connected physically. The diagram indicates that the presence of the device (F) is not directly visible to the device (A), because they are not directly connected. However, the embodiments enable the device A or a master of the USB ecosystem to determine information about the device (F).

Figure 7:
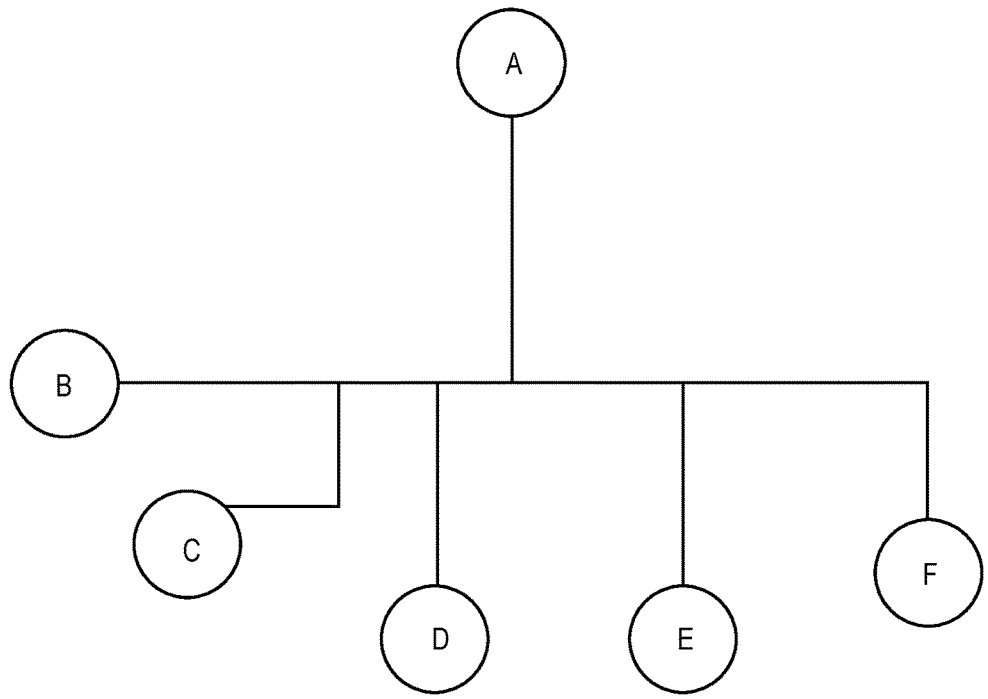
FIG. 7 is a diagram of another embodiment of a USB device hierarchy.

FIG. 7 is a diagram of one embodiment of a modified hierarchy of the USB ecosystem. The embodiments enable the device (F) to be made visible to the master of the USB ecosystem. The master in this example is the device (A), which is also the power source of the USB ecosystem. The master has information on all members of the USB ecosystem and is able to enable a better power allocation and conservation using the knowledge built from the advertisement of the members, which include their characteristics such as power requirements and capabilities. The master is thus functionally connected via the eDPM of each device as shown if FIG. 7, even though the physical connections are what is represented in FIG. 6.

Figure 8:
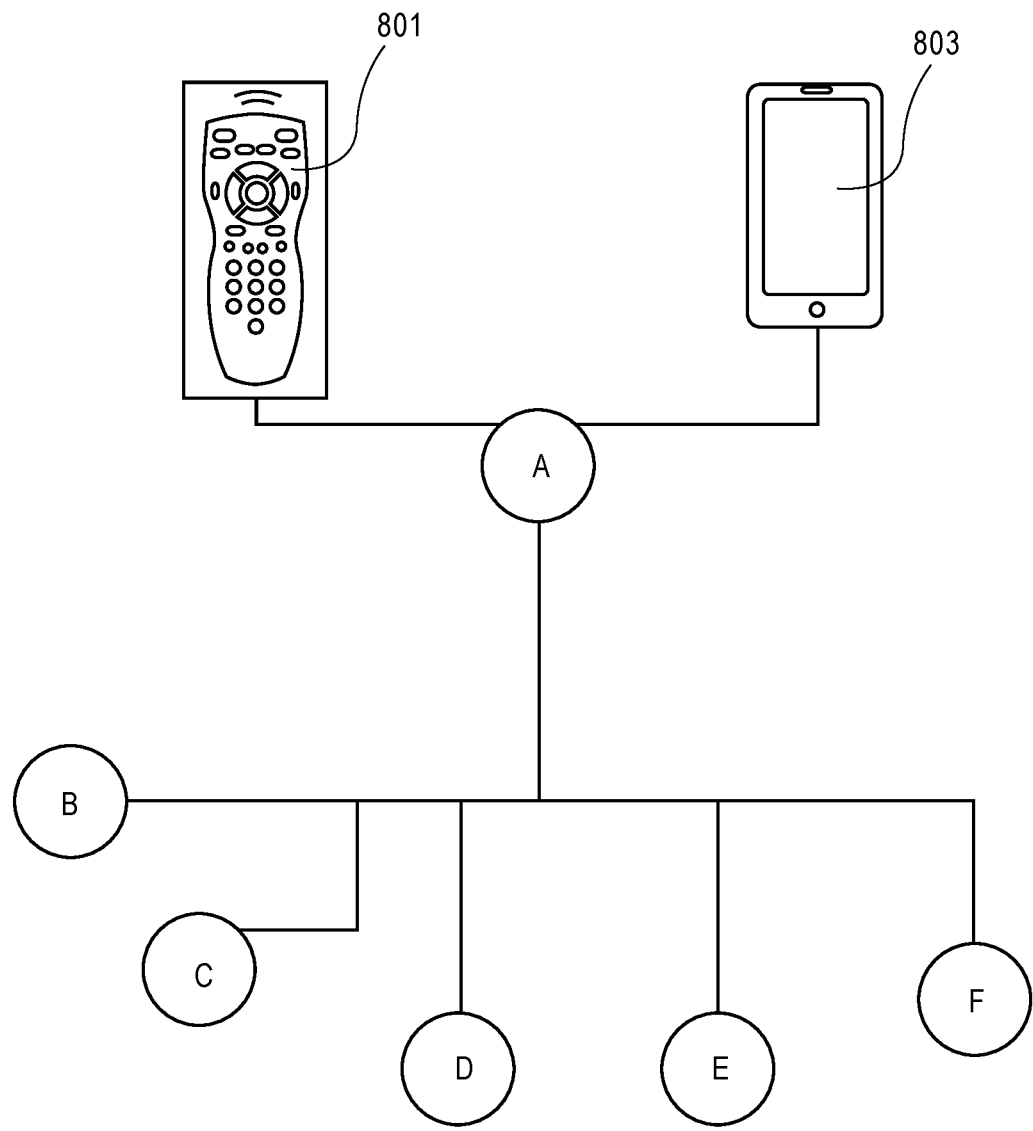
FIG. 8 is a diagram of a further embodiment of a USB device hierarchy.

FIG. 8 is a diagram of one embodiment of the USB ecosystem hierarch that incorporates mechanisms outside the network. These additional mechanisms, illustrated as a remote control 801 and mobile device 803 are known to the USB ecosystem either by their own advertisements or by the advertisement of associated devices, in this case device (A). The master of the USB ecosystem has the ability control these additional devices via the eDPM of the associated device, in this example the eDPM of device (A). In some embodiments, these devices outside the USB ecosystem can function as the master or one of a set of masters for the USB ecosystem. The mobile device 803 may include an application through which a user can manage the USB ecosystem and can have an associated device (A) relay the information of the network or can alternately participate in the second communication medium with each of the devices in the USB ecosystem.

Figure 9:
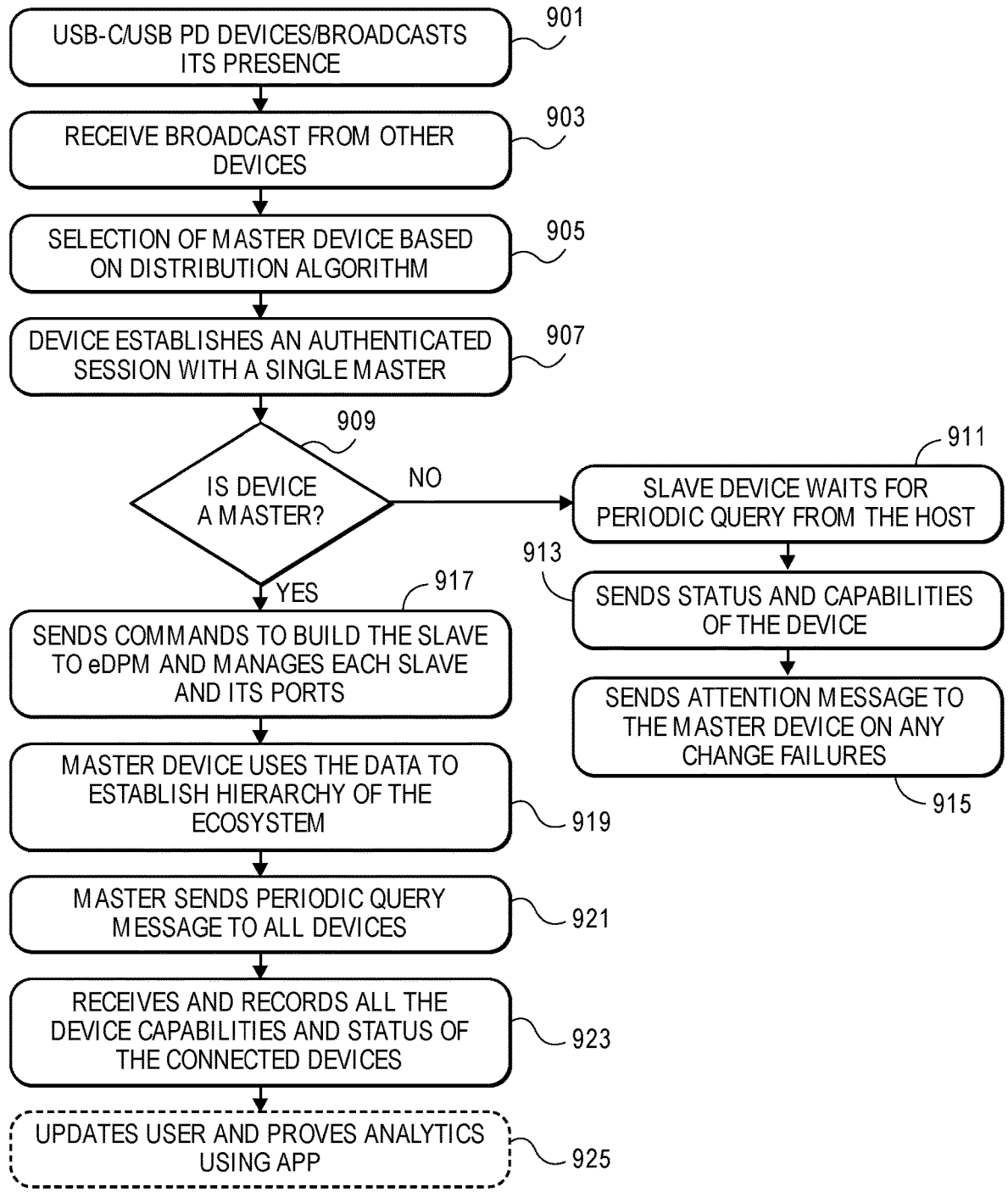
FIG. 9 is a diagram of a process for establishing an expanded USB ecosystem.

FIG. 9 is a diagram of one embodiment of the operation of a device in a USB ecosystem. The process can be implemented via the eDPM and/or similar components of the USB subsystem of each device in the USB ecosystem. In one embodiment, the process is initiated at power-up for a device, which responds by broadcasting the presence of the device using a secondary communication medium (Block 901). The broadcast can also be triggered periodically, when other broadcasts are detected (e.g., when a new device joins the USB ecosystem) or under similar conditions. The broadcast can also be manually triggered by user interaction with the device or a pre-existing master. The broadcast information can include identification information for the sending device along with device capabilities. The device capabilities can include power requirements, power source information, power state, data capabilities, attached device information and similar information. The broadcast can have any format and use any protocol compatible with the secondary communication medium such as 802.11x (including 802.11 a/b/g/n/ac/ah), Bluetooth, InfraRed, Radio Frequency and similar technologies.

The device (i.e., the eDPM) in turn receives the broadcast information from other devices enabling it to determine the topology or hierarchy of devices in the USB ecosystem (Block 903). With this information about the USB ecosystem, the eDPM can determine a master for the USB ecosystem (Block 905). The selection of the master is a distributed process that can be based on power sourcing capability, computing capability, or similar criteria. The process can be based on any criteria and can select a single master or a subset of the available devices as masters.

Once a master is selected, then each device establishes an authenticated session with the master (Block 907). The authenticated session can be over the second communication medium. Any type of communication protocol or session can be utilized. The communication session is utilized to exchange data and configuration information between the master and each of the other devices or 'slaves.' Each device determines whether it has a role as the master or as a slave (Block 909). The devices functioning as slaves are primarily to report information to the master and to receive configuration information from the master. In contrast, the master may query and receive operational information from each of the slaves about the slaves and any attached devices. The master sends out configuration information to efficiently manage the USB ecosystem.

Where the device is operating as a slave, the device can enter a state to await commands or queries from the master (Block 911). The device sends status information and current capabilities and requirements to the master (Block 913). This information can be sent periodically, in response to changes in the information, or in response to a query from the master. In some embodiments, the slave device sends notifications to the master in response to detected changes in operation or characteristics of the slave device or in response to detected failures in the USB ecosystem by the slave device. The changes and information can be related directly to the slave device, attached devices or devices connected by physical USB connections.

Where the device is selected as a master, the master sends commands to each of the slave devices (via their eDPM) to configure the operations of the slave devices and to manage the operations of each of their ports (Block 917). The master uses the broadcast data from the slave devices to determine a hierarchy of devices in the USB ecosystem (Block 919). This hierarchy can be utilized for determination of the best configuration of the slave devices to meet each of the requirements of the slave devices. The master device can send periodic requests to the slave devices to obtain updated information about their status (Block 921). When updated status and configuration data is received in response to the queries or when a new device is added to the USB ecosystem the master receives this information and updates its representation of the USB ecosystem (Block 923). As a result, the master can update its configuration of devices in the USB ecosystem and send out commands to each of the devices to affect this update.

In some embodiments, the master can also provide data, reports and analytics to a connected application (Block 925). The application can be executed by a device in the USB ecosystem or can be external to the USB ecosystem but capable of communication with the master via the second communication medium. The application can also send configuration information and commands to the master that alter its processes, representations and causes the master to send out updated commands and configuration to the slave devices in the USB ecosystem.

Figure 10:
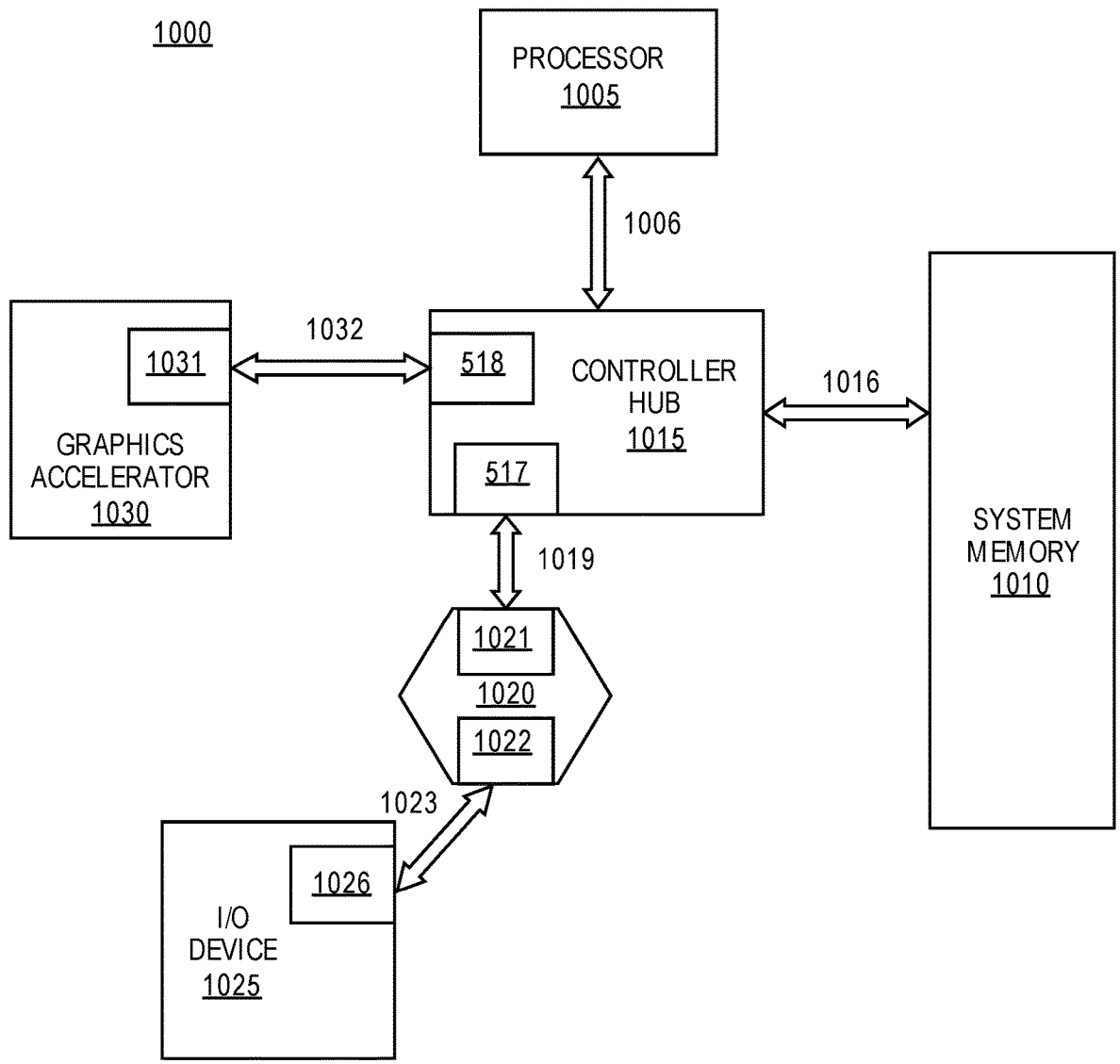
FIG. 10 illustrates a computing system including a peripheral component interconnect express (PCIe) compliant architecture according to embodiments of the disclosure.

Referring to FIG. 10, an embodiment of a fabric composed of point-to-point Links that interconnect a set of components is illustrated. System 1000 includes processor 1005 and system memory 1010 coupled to controller hub 1015. Processor 1005 includes any processing element, such as a microprocessor, a host processor, an embedded processor, a co-processor, or other processor. Processor 1005 is coupled to controller hub 1015 through front-side bus (FSB) 1006. In one embodiment, FSB 1006 is a serial point-to-point interconnect as described below. In another embodiment, link 1006 includes a serial, differential interconnect architecture that is compliant with different interconnect standard.

System memory 1010 includes any memory device, such as random access memory (RAM), non-volatile (NV) memory, or other memory accessible by devices in system 1000. System memory 1010 is coupled to controller hub 1015 through memory interface 1016. Examples of a memory interface include a double-data rate (DDR) memory interface, a dual-channel DDR memory interface, and a dynamic RAM (DRAM) memory interface.

In one embodiment, controller hub 1015 is a root hub, root complex, or root controller in a Peripheral Component Interconnect Express (PCIe or PCIE) interconnection hierarchy. Examples of controller hub 1015 include a chipset, a memory controller hub (MCH), a northbridge, an interconnect controller hub (ICH) a southbridge, and a root controller/hub. Often the term chipset refers to two physically separate controller hubs, e.g., a memory controller hub (MCH) coupled to an interconnect controller hub (ICH). Note that current systems often include the MCH integrated with processor 1005, while controller 1015 is to communicate with I/O devices, in a similar manner as described below. In some embodiments, peer-to-peer routing is optionally supported through root complex 1015.

Here, controller hub 1015 is coupled to switch/bridge 1020 through serial link 1019. Input/output modules 1017 and 1021, which may also be referred to as interfaces/ports 1017 and 1021, include/implement a layered protocol stack to provide communication between controller hub 1015 and switch 1020. In one embodiment, multiple devices are capable of being coupled to switch 1020.

Switch/bridge 1020 routes packets/messages from device 1025 upstream, e.g., up a hierarchy towards a root complex, to controller hub 1015 and downstream, e.g., down a hierarchy away from a root controller, from processor 1005 or system memory 1010 to device 1025. Switch 1020, in one embodiment, is referred to as a logical assembly of multiple virtual PCI-to-PCI bridge devices. Device 1025 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 1025 may include a PCIe to PCI/PCI-X bridge to support legacy or other version PCI devices. Endpoint devices in PCIe are often classified as legacy, PCIe, or root complex integrated endpoints.

Graphics accelerator 1030 is also coupled to controller hub 1015 through serial link 1032. In one embodiment, graphics accelerator 1030 is coupled to an MCH, which is coupled to an ICH. Switch 1020, and accordingly to I/O device 1025 through serial link 1023, is then coupled to the ICH. I/O modules 1031 and 1018 are also to implement a layered protocol stack to communicate between graphics accelerator 1030 and controller hub 1015. Similar to the MCH discussion above, a graphics controller or the graphics accelerator 1030 itself may be integrated in processor 1005. The embodiments described above can incorporate elements executed by the processor 1005 and involving the controller hub 105 and other components such as the i/o device 1025.

Figure 11:
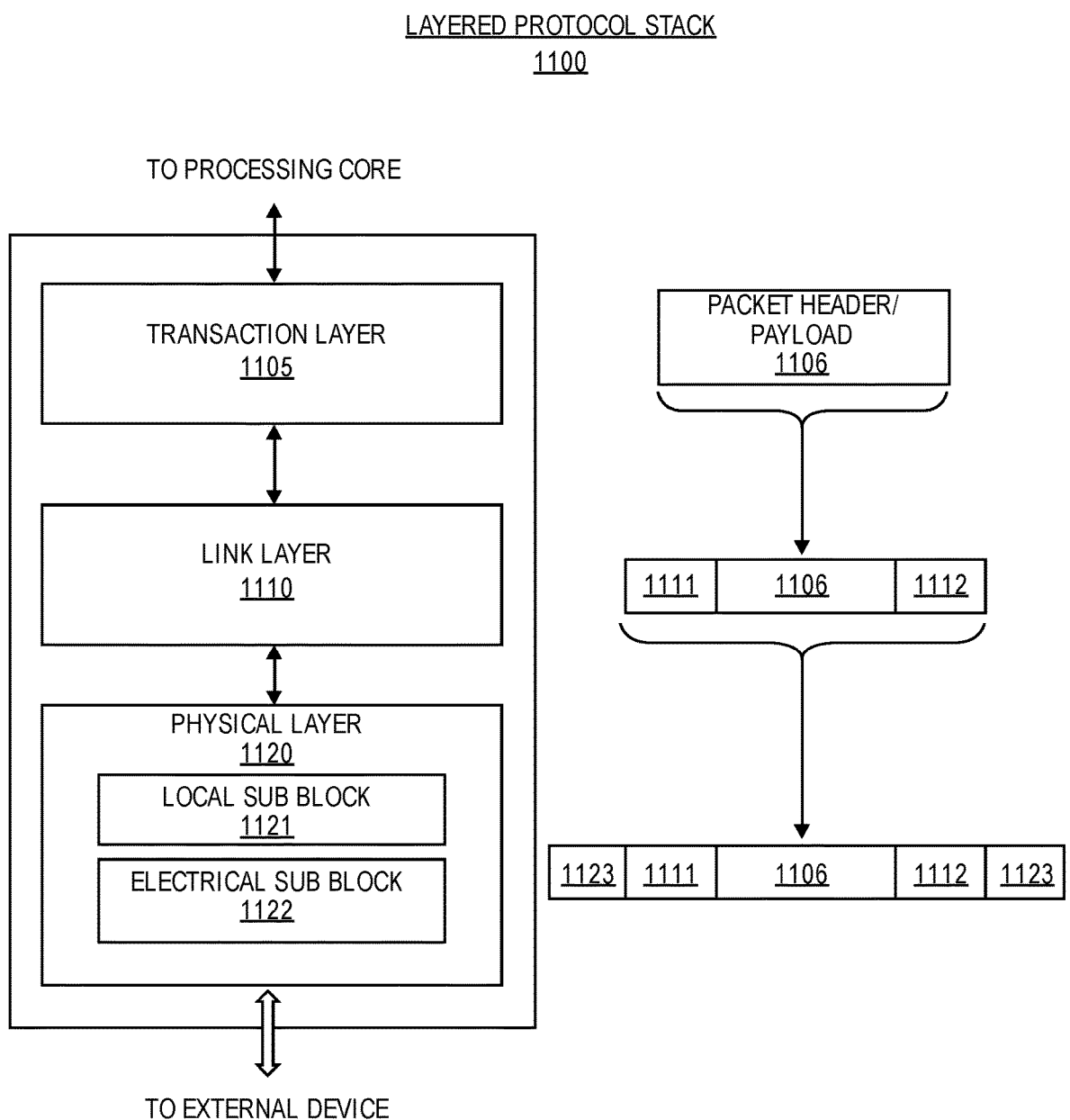
FIG. 11 illustrates a PCIe compliant interconnect architecture including a layered stack according to embodiments of the disclosure.

Turning to FIG. 11 an embodiment of a layered protocol stack is illustrated. Layered protocol stack 1100 includes any form of a layered communication stack, such as a Quick Path Interconnect (QPI) stack, a PCIe stack, a next generation high performance computing interconnect stack, or other layered stack. Although the discussion immediately below in reference to FIGS. 10-13 are in relation to a PCIe stack, the same concepts may be applied to other interconnect stacks. In one embodiment, protocol stack 1100 is a PCIe protocol stack including transaction layer 1105, link layer 1110, and physical layer 1120. An interface, such as interfaces 1017, 1018, 1021, 1022, 1026, and 1031 in FIG. 10, may be represented as communication protocol stack 1100. Representation as a communication protocol stack may also be referred to as a module or interface implementing/including a protocol stack.

PCI Express uses packets to communicate information between components. Packets are formed in the Transaction Layer 1105 and Data Link Layer 1110 to carry the information from the transmitting component to the receiving component. As the transmitted packets flow through the other layers, they are extended with additional information necessary to handle packets at those layers. At the receiving side the reverse process occurs and packets get transformed from their Physical Layer 1120 representation to the Data Link Layer 1110 representation and finally (for Transaction Layer Packets) to the form that can be processed by the Transaction Layer 1105 of the receiving device.

Transaction Layer

In one embodiment, transaction layer 1105 is to provide an interface between a device's processing core and the interconnect architecture, such as data link layer 1110 and physical layer 1120. In this regard, a primary responsibility of the transaction layer 1105 is the assembly and disassembly of packets (e.g., transaction layer packets, or TLPs). The translation layer 1105 typically manages credit-base flow control for TLPs. PCIe implements split transactions, e.g., transactions with request and response separated by time, allowing a link to carry other traffic while the target device gathers data for the response.

In addition, PCIe utilizes credit-based flow control. In this scheme, a device advertises an initial amount of credit for each of the receive buffers in Transaction Layer 1105. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 1105 assembles packet header/payload 1106. Format for current packet headers/payloads may be found in the PCIe specification at the PCIe specification website.

Figure 12:
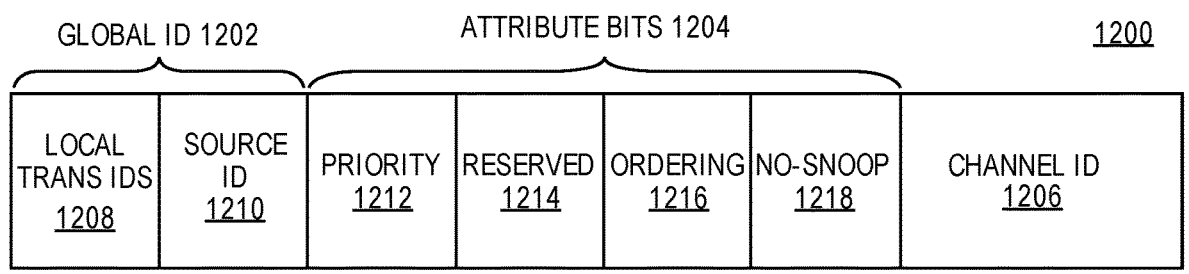
FIG. 12 illustrates a PCIe compliant request or packet to be generated or received within an interconnect architecture according to embodiments of the disclosure.

Referring to FIG. 12, an embodiment of a PCIe transaction descriptor is illustrated. In one embodiment, transaction descriptor 1200 is a mechanism for carrying transaction information. In this regard, transaction descriptor 1200 supports identification of transactions in a system. Other potential uses include tracking modifications of default transaction ordering and association of transaction with channels.

Transaction descriptor 1200 includes global identifier field 1202, attributes field 1204 and channel identifier field 1206. In the illustrated example, global identifier field 1202 is depicted comprising local transaction identifier field 1208 and source identifier field 1210. In one embodiment, global transaction identifier 1202 is unique for all outstanding requests.

According to one implementation, local transaction identifier field 1208 is a field generated by a requesting agent, and it is unique for all outstanding requests that require a completion for that requesting agent. Furthermore, in this example, source identifier 1210 uniquely identifies the requestor agent within a PCIe hierarchy. Accordingly, together with source ID 1210, local transaction identifier 1208 field provides global identification of a transaction within a hierarchy domain.

Attributes field 1204 specifies characteristics and relationships of the transaction. In this regard, attributes field 1204 is potentially used to provide additional information that allows modification of the default handling of transactions. In one embodiment, attributes field 1204 includes priority field 1212, reserved field 1214, ordering field 1216, and no-snoop field 1218. Here, priority sub-field 1212 may be modified by an initiator to assign a priority to the transaction. Reserved attribute field 1214 is left reserved for future, or vendor-defined usage. Possible usage models using priority or security attributes may be implemented using the reserved attribute field.

In this example, ordering attribute field 1216 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 1218 is utilized to determine if transactions are snooped. As shown, channel ID Field 1206 identifies a channel that a transaction is associated with.

Link Layer

Link layer 1110, also referred to as data link layer 1110, acts as an intermediate stage between transaction layer 1105 and the physical layer 1120. In one embodiment, a responsibility of the data link layer 1110 is providing a reliable mechanism for exchanging Transaction Layer Packets (TLPs) between two components a link. One side of the Data Link Layer 1110 accepts TLPs assembled by the Transaction Layer 1105, applies packet sequence identifier 1111, e.g., an identification number or packet number, calculates and applies an error detection code, e.g., CRC 1112, and submits the modified TLPs to the Physical Layer 1120 for transmission across a physical to an external device.

Physical Layer

In one embodiment, physical layer 1120 includes logical sub block 1121 and electrical sub-block 1122 to physically transmit a packet to an external device. Here, logical sub-block 1121 is responsible for the "digital" functions of Physical Layer 1121. In this regard, the logical sub-block includes a transmit section to prepare outgoing information for transmission by physical sub-block 1122, and a receiver section to identify and prepare received information before passing it to the Link Layer 1110.

Physical block 1122 includes a transmitter and a receiver. The transmitter is supplied by logical sub-block 1121 with symbols, which the transmitter serializes and transmits onto to an external device. The receiver is supplied with serialized symbols from an external device and transforms the received signals into a bit-stream. The bit-stream is de-serialized and supplied to logical sub-block 1121. In one embodiment, an 8b/10b transmission code is employed, where ten-bit symbols are transmitted/received. Here, special symbols are used to frame a packet with frames 1123. In addition, in one example, the receiver also provides a symbol clock recovered from the incoming serial stream.

As stated above, although transaction layer 1105, link layer 1110, and physical layer 1120 are discussed in reference to a specific embodiment of a PCIe protocol stack, a layered protocol stack is not so limited. In fact, any layered protocol may be included/implemented. As an example, a port/interface that is represented as a layered protocol includes: (1) a first layer to assemble packets, e.g., a transaction layer; a second layer to sequence packets, e.g., a link layer; and a third layer to transmit the packets, e.g., a physical layer. As a specific example, a common standard interface (CSI) layered protocol is utilized.

Figure 13:
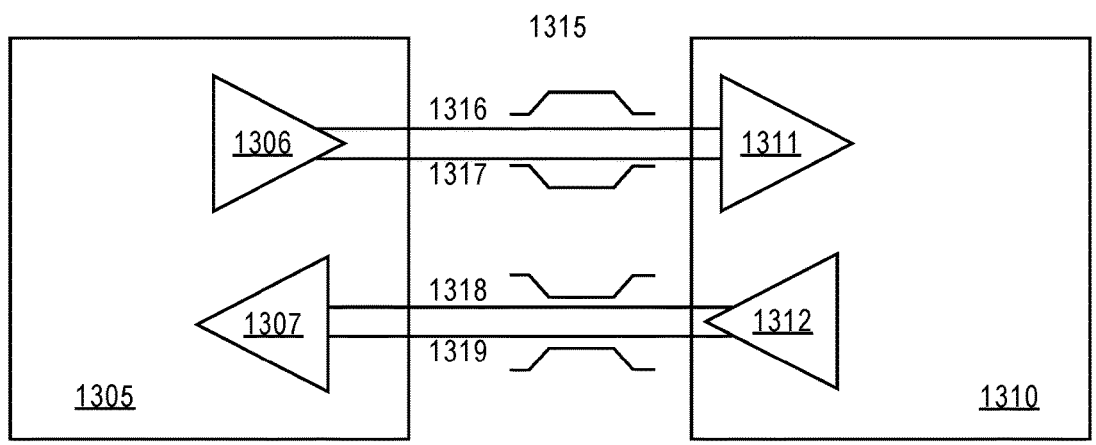
FIG. 13 illustrates a transmitter and receiver pair for a PCIe compliant interconnect architecture according to embodiments of the disclosure.

Referring next to FIG. 13, an embodiment of a PCIe serial point to point fabric 1300 is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 1306/1311 and a receive pair 1312/1307. Accordingly, device 1305 includes transmission logic 1306 to transmit data to device 1310 and receiving logic 1307 to receive data from device 1310. In other words, two transmitting paths, e.g., paths 1316 and 1317, and two receiving paths, e.g., paths 1318 and 1319, are included in a PCIe link.

A transmission path refers to any path for transmitting data, such as a transmission line, a copper line, an optical line, a wireless communication channel, an infrared communication link, or other communication path. A connection between two devices, such as device 1305 and device 1310, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 1316 and 1317, to transmit differential signals. As an example, when line 1316 toggles from a low voltage level to a high voltage level, e.g., a rising edge, line 1317 drives from a high logic level to a low logic level, e.g., a falling edge. Differential signals potentially demonstrate better electrical characteristics, such as better signal integrity, e.g., cross-coupling, voltage overshoot/undershoot, ringing, etc. This allows for better timing window, which enables faster transmission frequencies.

Figure 14:
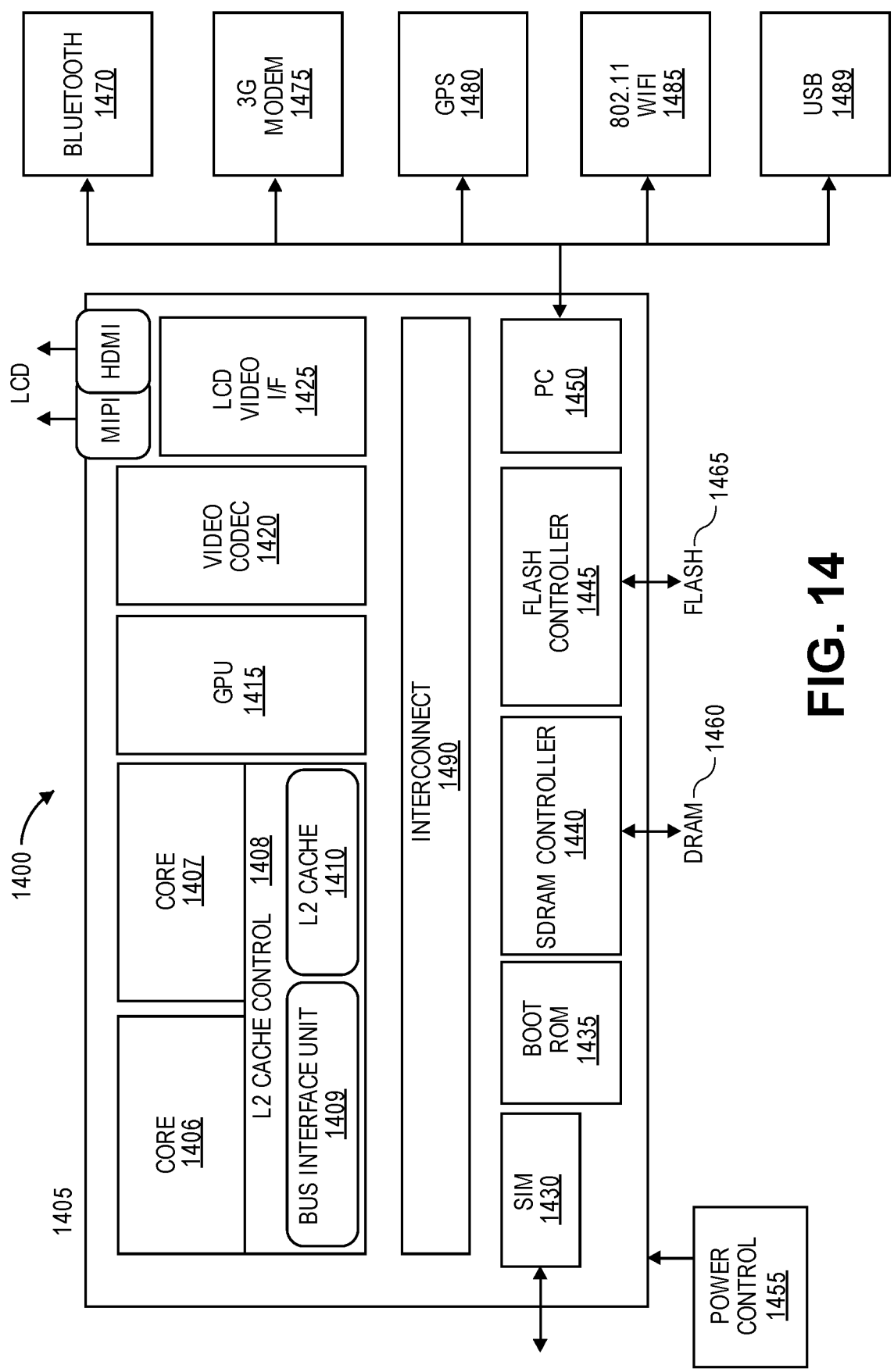
FIG. 14 illustrates a computing system on a chip according to embodiments of the disclosure.

Turning next to FIG. 14, an embodiment of a system on-chip (SOC) design in accordance with the embodiments is depicted. As a specific illustrative example, SOC 1400 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1400 includes 2 cores—1406 and 1407. Similar to the discussion above, cores 1406 and 1407 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1406 and 1407 are coupled to cache control 1408 that is associated with bus interface unit 1409 and L2 cache 1410 to communicate with other parts of system 1400. Interconnect 1490 includes an on-chip interconnect, such as an IOSF, AMBA, or other interconnect discussed above, which potentially implements one or more aspects of the described embodiments.

Interconnect 1490 provides communication channels to the other components, such as a Subscriber Identity Module (SIM) 1430 to interface with a SIM card, a boot ROM 1435 to hold boot code for execution by cores 1406 and 1407 to initialize and boot SOC 1400, a SDRAM controller 1440 to interface with external memory (e.g. DRAM 1460), a flash controller 1445 to interface with non-volatile memory (e.g. Flash 1465), a peripheral control 1450 (e.g. Serial Peripheral Interface) to interface with peripherals, video codecs 1420 and Video interface 1425 to display and receive input (e.g. touch enabled input), GPU 1415 to perform graphics related computations, etc. Any of these interfaces may incorporate aspects of the embodiments described herein.

In addition, the system illustrates peripherals for communication, such as a Bluetooth module 1470, 3G modem 1475, GPS 1480, and WiFi 1485. The embodiments may establish the USB ecosystem via the WiFI 1485 and the eDPM can be implemented in the SOC 1400 and USB port 1489. Note as stated above, a UE includes a radio for communication. As a result, these peripheral communication modules are not all required. However, in a UE some form a radio for external communication is to be included.

Note that the apparatus, methods, and systems described above may be implemented in any electronic device or system as aforementioned. As specific illustrations, the figures below provide exemplary systems for utilizing the embodiments as described herein. As the systems below are described in more detail, a number of different interconnects are disclosed, described, and revisited from the discussion above. And as is readily apparent, the advances described above may be applied to any of those interconnects, fabrics, or architectures.

Figure 15:
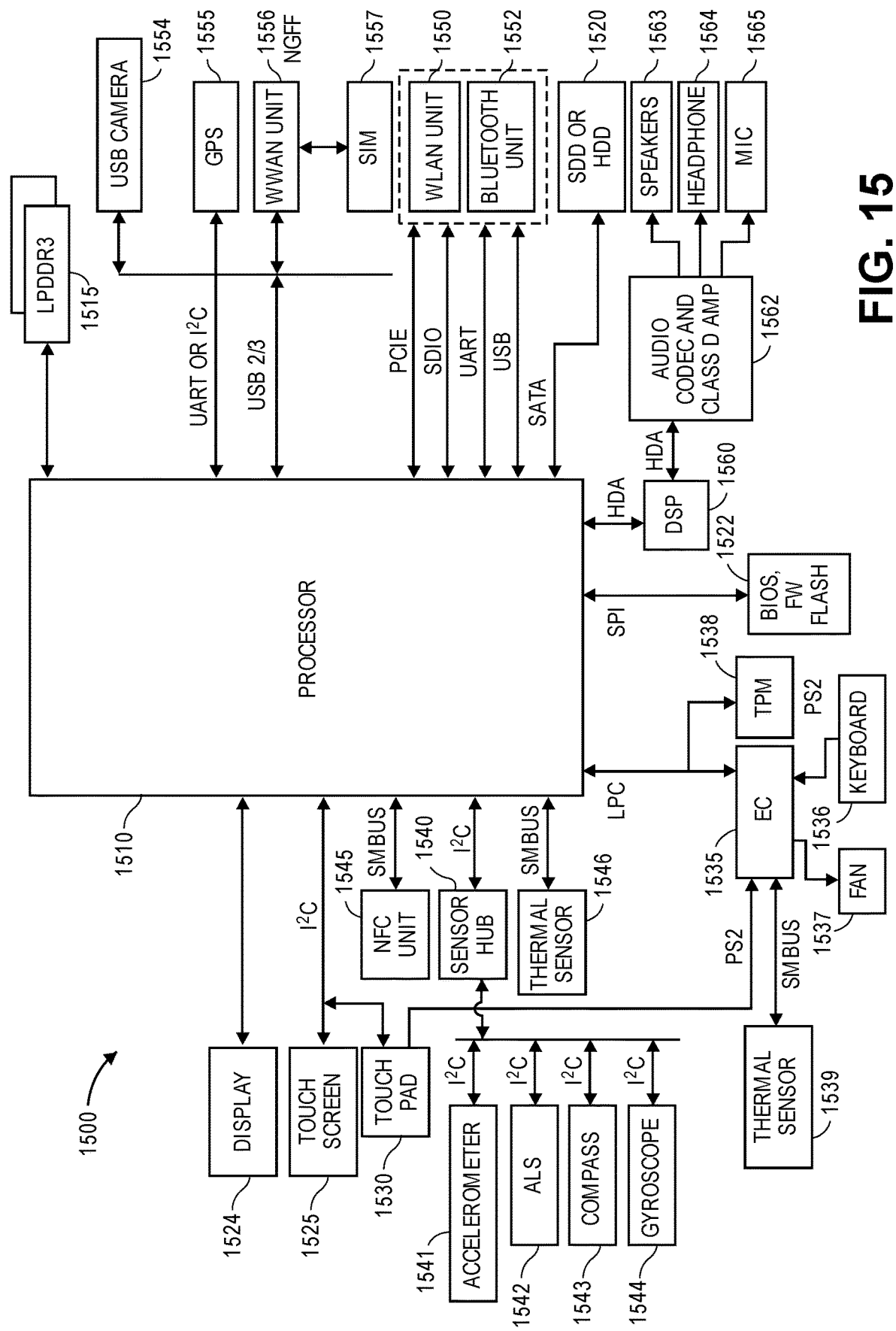
FIG. 15 illustrates an embodiment of a block diagram for a computing system.

Referring now to FIG. 15, a block diagram of components present in a computer system in accordance with embodiments of the disclosure is illustrated. As shown in FIG. 15, system 1500 includes any combination of components. These components may be implemented as ICs, portions thereof, discrete electronic devices, or other modules, logic, hardware, software, firmware, or a combination thereof adapted in a computer system, or as components otherwise incorporated within a chassis of the computer system. Note also that the block diagram of FIG. 15 is intended to show a high level view of many components of the computer system. However, it is to be understood that some of the components shown may be omitted, additional components may be present, and different arrangement of the components shown may occur in other implementations. As a result, the embodiments described above may be implemented in any portion of one or more of the interconnects illustrated or described below.

As seen in FIG. 15, a processor 1510, in one embodiment, includes a microprocessor, multi-core processor, multi-threaded processor, an ultra low voltage processor, an embedded processor, or other known processing element. In the illustrated implementation, processor 1510 acts as a main processing unit and central hub for communication with many of the various components of the system 1500. As one example, processor 1510 is implemented as a system on a chip (SoC). As a specific illustrative example, processor 1510 includes an Intel® Architecture Core™-based processor such as an i3, i5, i7 or another such processor available from Intel Corporation, Santa Clara, Calif. However, understand that other low power processors such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor. Note that many of the customer versions of such processors are modified and varied; however, they may support or recognize a specific instructions set that performs defined algorithms as set forth by the processor licensor. Here, the microarchitectural implementation may vary, but the architectural function of the processor is usually consistent. Certain details regarding the architecture and operation of processor 1510 in one implementation will be discussed further below to provide an illustrative example.

Processor 1510, in one embodiment, communicates with a system memory 1515. As an illustrative example, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2011), or a next generation LPDDR standard to be referred to as LPDDR3 or LPDDR4 that will offer extensions to LPDDR2 to increase bandwidth. In various implementations the individual memory devices may be of different package types such as single die package (SDP), dual die package (DDP) or quad die package (Q17P). These devices, in some embodiments, are directly soldered onto a motherboard to provide a lower profile solution, while in other embodiments the devices are configured as one or more memory modules that in turn couple to the motherboard by a given connector. And of course, other memory implementations are possible such as other types of memory modules, e.g., dual inline memory modules (DIMMs) of different varieties including but not limited to microDIMMs, MiniDIMMs. In a particular illustrative embodiment, memory is sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 1520 may also couple to processor 1510. In various embodiments, to enable a thinner and lighter system design as well as to improve system responsiveness, this mass storage may be implemented via a SSD. However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 15, a flash device 1522 may be coupled to processor 1510, e.g., via a serial peripheral interface (SPI). This flash device may provide for non-volatile storage of system software, including a basic input/output software (BIOS) as well as other firmware of the system.

In various embodiments, mass storage of the system is implemented by a SSD alone or as a disk, optical or other drive with an SSD cache. In some embodiments, the mass storage is implemented as a SSD or as a HDD along with a restore (RST) cache module. In various implementations, the HDD provides for storage of between 320 GB-4 terabytes (TB) and upward while the RST cache is implemented with a SSD having a capacity of 24 GB-256 GB. Note that such SSD cache may be configured as a single level cache (SLC) or multi-level cache (MLC) option to provide an appropriate level of responsiveness. In a SSD-only option, the module may be accommodated in various locations such as in a mSATA or NGFF slot. As an example, an SSD has a capacity ranging from 120 GB-1 TB.

Various input/output (IO) devices may be present within system 1500. Specifically shown in the embodiment of FIG. 15 is a display 1524 which may be a high definition LCD or LED panel configured within a lid portion of the chassis. This display panel may also provide for a touch screen 1525, e.g., adapted externally over the display panel such that via a user's interaction with this touch screen, user inputs can be provided to the system to enable desired operations, e.g., with regard to the display of information, accessing of information and so forth. In one embodiment, display 1524 may be coupled to processor 1510 via a display interconnect that can be implemented as a high performance graphics interconnect. Touch screen 1525 may be coupled to processor 1510 via another interconnect, which in an embodiment can be an I$^2$C interconnect. As further shown in FIG. 15, in addition to touch screen 1525, user input by way of touch can also occur via a touch pad 1530 which may be configured within the chassis and may also be coupled to the same I$^2$C interconnect as touch screen 1525.

The display panel may operate in multiple modes. In a first mode, the display panel can be arranged in a transparent state in which the display panel is transparent to visible light. In various embodiments, the majority of the display panel may be a display except for a bezel around the periphery. When the system is operated in a notebook mode and the display panel is operated in a transparent state, a user may view information that is presented on the display panel while also being able to view objects behind the display. In addition, information displayed on the display panel may be viewed by a user positioned behind the display. Or the operating state of the display panel can be an opaque state in which visible light does not transmit through the display panel.

In a tablet mode the system is folded shut such that the back display surface of the display panel comes to rest in a position such that it faces outwardly towards a user, when the bottom surface of the base panel is rested on a surface or held by the user. In the tablet mode of operation, the back display surface performs the role of a display and user interface, as this surface may have touch screen functionality and may perform other known functions of a conventional touch screen device, such as a tablet device. To this end, the display panel may include a transparency-adjusting layer that is disposed between a touch screen layer and a front display surface. In some embodiments the transparency-adjusting layer may be an electrochromic layer (EC), a LCD layer, or a combination of EC and LCD layers.

In various embodiments, the display can be of different sizes, e.g., an 11.6" or a 13.3" screen, and may have a 16:9 aspect ratio, and at least 300 nits brightness. Also the display may be of full high definition (HD) resolution (at least 1920×1080p), be compatible with an embedded display port (eDP), and be a low power panel with panel self-refresh.

As to touch screen capabilities, the system may provide for a display multi-touch panel that is multi-touch capacitive and being at least 5 finger capable. And in some embodiments, the display may be 10 finger capable. In one embodiment, the touch screen is accommodated within a damage and scratch-resistant glass and coating (e.g., Gorilla Glass™ or Gorilla Glass 2™) for low friction to reduce "finger burn" and avoid "finger skipping". To provide for an enhanced touch experience and responsiveness, the touch panel, in some implementations, has multi-touch functionality, such as less than 2 frames (30 Hz) per static view during pinch zoom, and single-touch functionality of less than 1 cm per frame (30 Hz) with 200 ms (lag on finger to pointer). The display, in some implementations, supports edge-to-edge glass with a minimal screen bezel that is also flush with the panel surface, and limited IO interference when using multi-touch.

For perceptual computing and other purposes, various sensors may be present within the system and may be coupled to processor 1510 in different manners. Certain inertial and environmental sensors may couple to processor 1510 through a sensor hub 1540, e.g., via an I²C interconnect. In the embodiment shown in FIG. 15, these sensors may include an accelerometer 1541, an ambient light sensor (ALS) 1542, a compass 1543 and a gyroscope 1544. Other environmental sensors may include one or more thermal sensors 1546 which in some embodiments couple to processor 1510 via a system management bus (SMBus). The embodiments may be implemented via USB ports and the processor 1510.

Using the various inertial and environmental sensors present in a platform, many different use cases may be realized. These use cases enable advanced computing operations including perceptual computing and also allow for enhancements with regard to power management/battery life, security, and system responsiveness.

For example with regard to power management/battery life issues, based at least on part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it may be determined whether a user is allowed to access certain secure documents. For example, a user may be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations may include providing for pairing of devices within a close range of each other, e.g., a portable platform as described herein and a user's desktop computer, mobile telephone or so forth. Certain sharing, in some implementations, are realized via near field communication when these devices are so paired. However, when the devices exceed a certain range, such sharing may be disabled. Furthermore, when pairing a platform as described herein and a smartphone, an alarm may be configured to be triggered when the devices move more than a predetermined distance from each other, when in a public location. In contrast, when these paired devices are in a safe location, e.g., a work place or home location, the devices may exceed this predetermined limit without triggering such alarm.

Responsiveness may also be enhanced using the sensor information. For example, even when a platform is in a low power state, the sensors may still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases may be enabled using sensor information obtained via the integrated sensors within a platform as described herein, and the above examples are only for purposes of illustration. Using a system as described herein, a perceptual computing system may allow for the addition of alternative input modalities, including gesture recognition, and enable the system to sense user operations and intent.

In some embodiments one or more infrared or other heat sensing elements, or any other element for sensing the presence or movement of a user may be present. Such sensing elements may include multiple different elements working together, working in sequence, or both. For example, sensing elements include elements that provide initial sensing, such as light or sound projection, followed by sensing for gesture detection by, for example, an ultrasonic time of flight camera or a patterned light camera.

Also in some embodiments, the system includes a light generator to produce an illuminated line. In some embodiments, this line provides a visual cue regarding a virtual boundary, namely an imaginary or virtual location in space, where action of the user to pass or break through the virtual boundary or plane is interpreted as an intent to engage with the computing system. In some embodiments, the illuminated line may change colors as the computing system transitions into different states with regard to the user. The illuminated line may be used to provide a visual cue for the user of a virtual boundary in space, and may be used by the system to determine transitions in state of the computer with regard to the user, including determining when the user wishes to engage with the computer.

In some embodiments, the computer senses user position and operates to interpret the movement of a hand of the user through the virtual boundary as a gesture indicating an intention of the user to engage with the computer. In some embodiments, upon the user passing through the virtual line or plane the light generated by the light generator may change, thereby providing visual feedback to the user that the user has entered an area for providing gestures to provide input to the computer.

Display screens may provide visual indications of transitions of state of the computing system with regard to a user. In some embodiments, a first screen is provided in a first state in which the presence of a user is sensed by the system, such as through use of one or more of the sensing elements.

In some implementations, the system acts to sense user identity, such as by facial recognition. Here, transition to a second screen may be provided in a second state, in which the computing system has recognized the user identity, where this second the screen provides visual feedback to the user that the user has transitioned into a new state. Transition to a third screen may occur in a third state in which the user has confirmed recognition of the user.

In some embodiments, the computing system may use a transition mechanism to determine a location of a virtual boundary for a user, where the location of the virtual boundary may vary with user and context. The computing system may generate a light, such as an illuminated line, to indicate the virtual boundary for engaging with the system. In some embodiments, the computing system may be in a waiting state, and the light may be produced in a first color. The computing system may detect whether the user has reached past the virtual boundary, such as by sensing the presence and movement of the user using sensing elements.

In some embodiments, if the user has been detected as having crossed the virtual boundary (such as the hands of the user being closer to the computing system than the virtual boundary line), the computing system may transition to a state for receiving gesture inputs from the user, where a mechanism to indicate the transition may include the light indicating the virtual boundary changing to a second color.

In some embodiments, the computing system may then determine whether gesture movement is detected. If gesture movement is detected, the computing system may proceed with a gesture recognition process, which may include the use of data from a gesture data library, which may reside in memory in the computing device or may be otherwise accessed by the computing device.

If a gesture of the user is recognized, the computing system may perform a function in response to the input, and return to receive additional gestures if the user is within the virtual boundary. In some embodiments, if the gesture is not recognized, the computing system may transition into an error state, where a mechanism to indicate the error state may include the light indicating the virtual boundary changing to a third color, with the system returning to receive additional gestures if the user is within the virtual boundary for engaging with the computing system.

As mentioned above, in other embodiments the system can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

In various embodiments, the accelerometer may be a 3-axis accelerometer having data rates of at least 50 Hz. A gyroscope may also be included, which can be a 3-axis gyroscope. In addition, an e-compass/magnetometer may be present. Also, one or more proximity sensors may be provided (e.g., for lid open to sense when a person is in proximity (or not) to the system and adjust power/performance to extend battery life). For some OS's Sensor Fusion capability including the accelerometer, gyroscope, and compass may provide enhanced features. In addition, via a sensor hub having a real-time clock (RTC), a wake from sensors mechanism may be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

In an embodiment, the OS may be a Microsoft® Windows® 8 OS that implements Connected Standby (also referred to herein as Win8 CS). Windows 8 Connected Standby or another OS having a similar state can provide, via a platform as described herein, very low ultra idle power to enable applications to remain connected, e.g., to a cloud-based location, at very low power consumption. The platform can supports 3 power states, namely screen on (normal); Connected Standby (as a default "off" state); and shutdown (zero watts of power consumption). Thus in the Connected Standby state, the platform is logically on (at minimal power levels) even though the screen is off. In such a platform, power management can be made to be transparent to applications and maintain constant connectivity, in part due to offload technology to enable the lowest powered component to perform an operation.

Also seen in FIG. 15, various peripheral devices may couple to processor 1510 via a low pin count (LPC) interconnect. In the embodiment shown, various components can be coupled through an embedded controller (EC) 1535. Such components can include a keyboard 1536 (e.g., coupled via a PS2 interface), a fan 1537, and a thermal sensor 1539. In some embodiments, touch pad 1530 may also couple to EC 1535 via a PS2 interface. In addition, a security processor such as a trusted platform module (TPM) 1538 in accordance with the Trusted Computing Group (TCG) TPM Specification Version 1.2, dated Oct. 2, 2003, may also couple to processor 1510 via this LPC interconnect. However, understand the scope of the present disclosure is not limited in this regard and secure processing and storage of secure information may be in another protected location such as a static random access memory (SRAM) in a security coprocessor, or as encrypted data blobs that are only decrypted when protected by a secure enclave (SE) processor mode.

In a particular implementation, peripheral ports may include a high definition media interface (HDMI) connector (which can be of different form factors such as full size, mini or micro); one or more USB ports, such as full-size external ports in accordance with a Universal Serial Bus specification, with at least one powered for charging of USB devices (such as smartphones) when the system is in Connected Standby state and is plugged into AC wall power. In addition, one or more Thunderbolt™ ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 1500 can communicate with external devices in a variety of manners, including wirelessly. In the embodiment shown in FIG. 15, various wireless modules, each of which can correspond to a radio configured for a particular wireless communication protocol, are present. One manner for wireless communication in a short range such as a near field may be via a near field communication (NFC) unit 1545 which may communicate, in one embodiment with processor 1510 via an SMBus. Note that via this NFC unit 1545, devices in close proximity to each other can communicate. For example, a user can enable system 1500 to communicate with another (e.g.,) portable device such as a smartphone of the user via adapting the two devices together in close relation and enabling transfer of information such as identification information payment information, data such as image data or so forth. Wireless power transfer may also be performed using a NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

As further seen in FIG. 15, additional wireless units can include other short range wireless engines including a WLAN unit 1550 and a Bluetooth unit 1552. Using WLAN unit 1550, Wi-Fi™ communications in accordance with a given Institute of Electrical and Electronics Engineers (IEEE) 802.11 standard can be realized, while via Bluetooth unit 1552, short range communications via a Bluetooth protocol can occur. These units may communicate with processor 1510 via, e.g., a USB link or a universal asynchronous receiver transmitter (UART) link. Or these units may couple to processor 1510 via an interconnect according to a Peripheral Component Interconnect Express™ (PCIe™) protocol, e.g., in accordance with the PCI Express™ Specification Base Specification version 3.0 (published Nov. 10, 2010), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 1556 which in turn may couple to a subscriber identity module (SIM) 1557. In addition, to enable receipt and use of location information, a GPS module 1555 may also be present. Note that in the embodiment shown in FIG. 15, WWAN unit 1556 and an integrated capture device such as a camera module 1554 may communicate via a given USB protocol, e.g., USB 2.0 or 3.0 link, or a UART or I²C protocol. Again the actual physical connection of these units can be via adaptation of a NGFF add-in card to an NGFF connector configured on the motherboard.

In a particular embodiment, wireless functionality can be provided modularly, e.g., with a WiFi™ 802.11 ac solution (e.g., add-in card that is backward compatible with IEEE 802.11abgn) with support for Windows 8 CS. This card can be configured in an internal slot (e.g., via an NGFF adapter). An additional module may provide for Bluetooth capability (e.g., Bluetooth 4.0 with backwards compatibility) as well as Intel® Wireless Display functionality. In addition NFC support may be provided via a separate device or multifunction device, and can be positioned as an example, in a front right portion of the chassis for easy access. A still additional module may be a WWAN device that can provide support for 3G/4G/LTE and GPS. This module can be implemented in an internal (e.g., NGFF) slot. Integrated antenna support can be provided for WiFi™, Bluetooth, WWAN, NFC and GPS, enabling seamless transition from WiFi™ to WWAN radios, wireless gigabit (WiGig) in accordance with the Wireless Gigabit Specification (July 2010), and vice versa.

As described above, an integrated camera can be incorporated in the lid. As one example, this camera can be a high resolution camera, e.g., having a resolution of at least 2.0 megapixels (MP) and extending to 6.0 MP and beyond.

To provide for audio inputs and outputs, an audio processor can be implemented via a digital signal processor (DSP) 1560, which may couple to processor 1510 via a high definition audio (HDA) link. Similarly, DSP 1560 may communicate with an integrated coder/decoder (CODEC) and amplifier 1562 that in turn may couple to output speakers 1563 which may be implemented within the chassis. Similarly, amplifier and CODEC 1562 can be coupled to receive audio inputs from a microphone 1565 which in an embodiment can be implemented via dual array microphones (such as a digital microphone array) to provide for high quality audio inputs to enable voice-activated control of various operations within the system. Note also that audio outputs can be provided from amplifier/CODEC 1562 to a headphone jack 1564. Although shown with these particular components in the embodiment of FIG. 15, understand the scope of the present disclosure is not limited in this regard.

In a particular embodiment, the digital audio codec and amplifier are capable of driving the stereo headphone jack, stereo microphone jack, an internal microphone array and stereo speakers. In different implementations, the codec can be integrated into an audio DSP or coupled via an HD audio path to a peripheral controller hub (PCH). In some implementations, in addition to integrated stereo speakers, one or more bass speakers can be provided, and the speaker solution can support DTS audio.

In some embodiments, processor 1510 may be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR may be powered down or off when the processor is placed into a certain low power state, while another power plane of another FIVR remains active, or fully powered.

In one embodiment, a sustain power plane can be used during some deep sleep states to power on the I/O pins for several I/O signals, such as the interface between the processor and a PCH, the interface with the external VR and the interface with EC 1535. This sustain power plane also powers an on-die voltage regulator that supports the onboard SRAM or other cache memory in which the processor context is stored during the sleep state. The sustain power plane is also used to power on the processor's wakeup logic that monitors and processes the various wakeup source signals.

During power management, while other power planes are powered down or off when the processor enters certain deep sleep states, the sustain power plane remains powered on to support the above-referenced components. However, this can lead to unnecessary power consumption or dissipation when those components are not needed. To this end, embodiments may provide a connected standby sleep state to maintain processor context using a dedicated power plane. In one embodiment, the connected standby sleep state facilitates processor wakeup using resources of a PCH which itself may be present in a package with the processor. In one embodiment, the connected standby sleep state facilitates sustaining processor architectural functions in the PCH until processor wakeup, this enabling turning off all of the unnecessary processor components that were previously left powered on during deep sleep states, including turning off all of the clocks. In one embodiment, the PCH contains a time stamp counter (TSC) and connected standby logic for controlling the system during the connected standby state. The integrated voltage regulator for the sustain power plane may reside on the PCH as well.

In an embodiment, during the connected standby state, an integrated voltage regulator may function as a dedicated power plane that remains powered on to support the dedicated cache memory in which the processor context is stored such as critical state variables when the processor enters the deep sleep states and connected standby state. This critical state may include state variables associated with the architectural, micro-architectural, debug state, and/or similar state variables associated with the processor.

The wakeup source signals from EC 1635 may be sent to the PCH instead of the processor during the connected standby state so that the PCH can manage the wakeup processing instead of the processor. In addition, the TSC is maintained in the PCH to facilitate sustaining processor architectural functions. Although shown with these particular components in the embodiment of FIG. 12, understand the scope of the present disclosure is not limited in this regard.

Power control in the processor can lead to enhanced power savings. For example, power can be dynamically allocate between cores, individual cores can change frequency/voltage, and multiple deep low power states can be provided to enable very low power consumption. In addition, dynamic control of the cores or independent core portions can provide for reduced power consumption by powering off components when they are not being used.

Some implementations may provide a specific power management IC (PMIC) to control platform power. Using this solution, a system may see very low (e.g., less than 5%) battery degradation over an extended duration (e.g., 16 hours) when in a given standby state, such as when in a Win8 Connected Standby state. In a Win8 idle state a battery life exceeding, e.g., 9 hours may be realized (e.g., at 150 nits). As to video playback, a long battery life can be realized, e.g., full HD video playback can occur for a minimum of 6 hours. A platform in one implementation may have an energy capacity of, e.g., 35 watt hours (Whr) for a Win8 CS using an SSD and (e.g.,) 40-44 Whr for Win8 CS using an HDD with a RST cache configuration.

A particular implementation may provide support for 15 W nominal CPU thermal design power (TDP), with a configurable CPU TDP of up to approximately 25 W TDP design point. The platform may include minimal vents owing to the thermal features described above. In addition, the platform is pillow-friendly (in that no hot air is blowing at the user). Different maximum temperature points can be realized depending on the chassis material. In one implementation of a plastic chassis (at least having to lid or base portion of plastic), the maximum operating temperature can be 52 degrees Celsius (C). And for an implementation of a metal chassis, the maximum operating temperature can be 46° C.

In different implementations, a security module such as a TPM can be integrated into a processor or can be a discrete device such as a TPM 2.0 device. With an integrated security module, also referred to as Platform Trust Technology (PTT), BIOS/firmware can be enabled to expose certain hardware features for certain security features, including secure instructions, secure boot, Intel® Anti-Theft Technology, Intel® Identity Protection Technology, Intel® Trusted Execution Technology (TXT), and Intel® Manageability Engine Technology along with secure user interfaces such as a secure keyboard and display.

Figure 16:
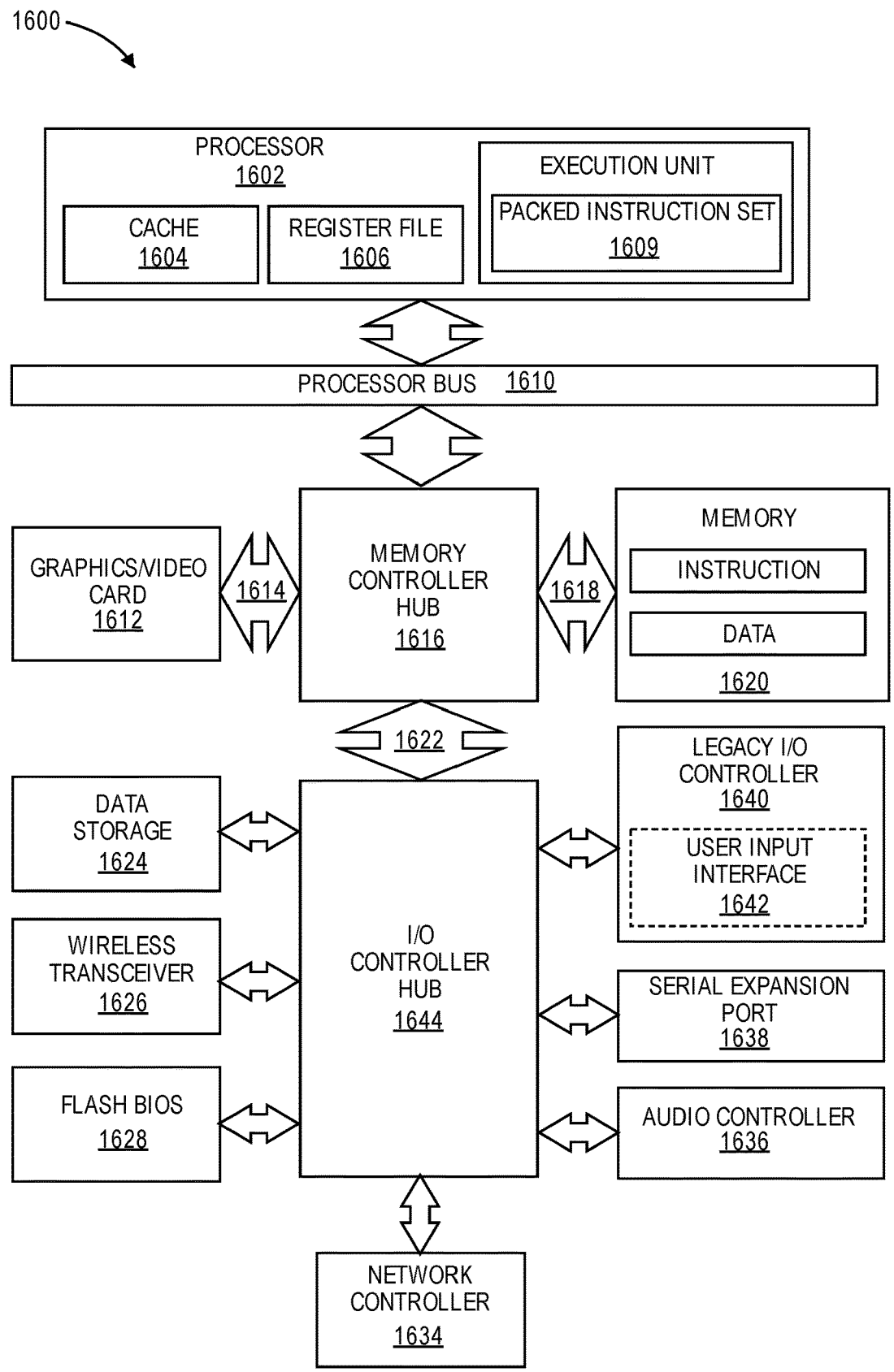
FIG. 16 illustrates another embodiment of a block diagram for a computing system.

Turning to FIG. 16, a block diagram of an exemplary computer system formed with a processor that includes execution units to execute an instruction, where one or more of the interconnects implement one or more features in accordance with embodiments of the disclosure is illustrated. System 1600 includes a component, such as a processor 1602 to employ execution units including logic to perform algorithms for process data, in accordance with the present disclosure, such as in the embodiment described herein. System 1600 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 1600 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry and software.

Embodiments are not limited to computer systems. Alternative embodiments of the present disclosure can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 1602 includes one or more execution units 1608 to implement an algorithm that is to perform at least one instruction. One embodiment may be described in the context of a single processor desktop or server system, but alternative embodiments may be included in a multiprocessor system. System 1600 is an example of a 'hub' system architecture. The computer system 1600 includes a processor 1602 to process data signals. The processor 1602, as one illustrative example, includes a complex instruction set computer (CISC) microprocessor, a reduced instruction set computing (RISC) microprocessor, a very long instruction word (VLIW)

microprocessor, a processor implementing a combination of instruction sets, or any other processor device, such as a digital signal processor, for example. The processor 1602 is coupled to a processor bus 1610 that transmits data signals between the processor 1602 and other components in the system 1600. The elements of system 1600 (e.g. graphics accelerator 1612, memory controller hub 1616, memory 1620, I/O controller hub 1644, wireless transceiver 1626, Flash BIOS 1628, Network controller 1634, Audio controller 1636, Serial expansion port 1638, I/O controller 1640, etc.) perform their conventional functions that are well known to those familiar with the art.

In one embodiment, the processor 1602 includes a Level 1 (L1) internal cache memory 1604. Depending on the architecture, the processor 1602 may have a single internal cache or multiple levels of internal caches. Other embodiments include a combination of both internal and external caches depending on the particular implementation and needs. Register file 1606 is to store different types of data in various registers including integer registers, floating point registers, vector registers, banked registers, shadow registers, checkpoint registers, status registers, and instruction pointer register. Embodiments may be implemented via the processor 1602, i/o controller hub 1644, wireless transceiver 1626 and USB ports (e.g., via a USB controller coupled to the I/O controller hub 1644.

Execution unit 1608, including logic to perform integer and floating point operations, also resides in the processor 1602. The processor 1602, in one embodiment, includes a microcode (μcode) ROM to store microcode, which when executed, is to perform algorithms for certain macroinstructions or handle complex scenarios. Here, microcode is potentially updateable to handle logic bugs/fixes for processor 1602. For one embodiment, execution unit 1608 includes logic to handle a packed instruction set 1609. By including the packed instruction set 1609 in the instruction set of a general-purpose processor 1602, along with associated circuitry to execute the instructions, the operations used by many multimedia applications may be performed using packed data in a general-purpose processor 1602. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 1608 may also be used in micro controllers, embedded processors, graphics devices, DSPs, and other types of logic circuits. System 1600 includes a memory 1620. Memory 1620 includes a dynamic random access memory (DRAM) device, a static random access memory (SRAM) device, flash memory device, or other memory device. Memory 1620 stores instructions and/or data represented by data signals that are to be executed by the processor 1602.

Note that any of the aforementioned features or aspects of the embodiments of the disclosure may be utilized on one or more interconnect illustrated in FIG. 16. For example, an on-die interconnect (ODI), which is not shown, for coupling internal units of processor 1602 implements one or more aspects of the disclosure herein. Or the embodiments of the disclosure are associated with a processor bus 1610 (e.g. Intel Quick Path Interconnect (QPI) or other known high performance computing interconnect), a high bandwidth memory path 1618 to memory 1620, a point-to-point link 1614 to graphics accelerator 1612 (e.g. a Peripheral Component Interconnect express (PCIe) compliant fabric), a controller hub interconnect 1622, an I/O or other interconnect (e.g. USB, PCI, PCIe) for coupling the other illustrated components. Some examples of such components include the audio controller 1636, firmware hub (flash BIOS) 1628, wireless transceiver 1626, data storage 1624, legacy I/O controller 1610 containing user input and keyboard interfaces 1642, a serial expansion port 1638 such as Universal Serial Bus (USB), and a network controller 1634. The data storage device 1624 can comprise a hard disk drive, a floppy disk drive, a CD-ROM device, a flash memory device, or other mass storage device.

Figure 17:
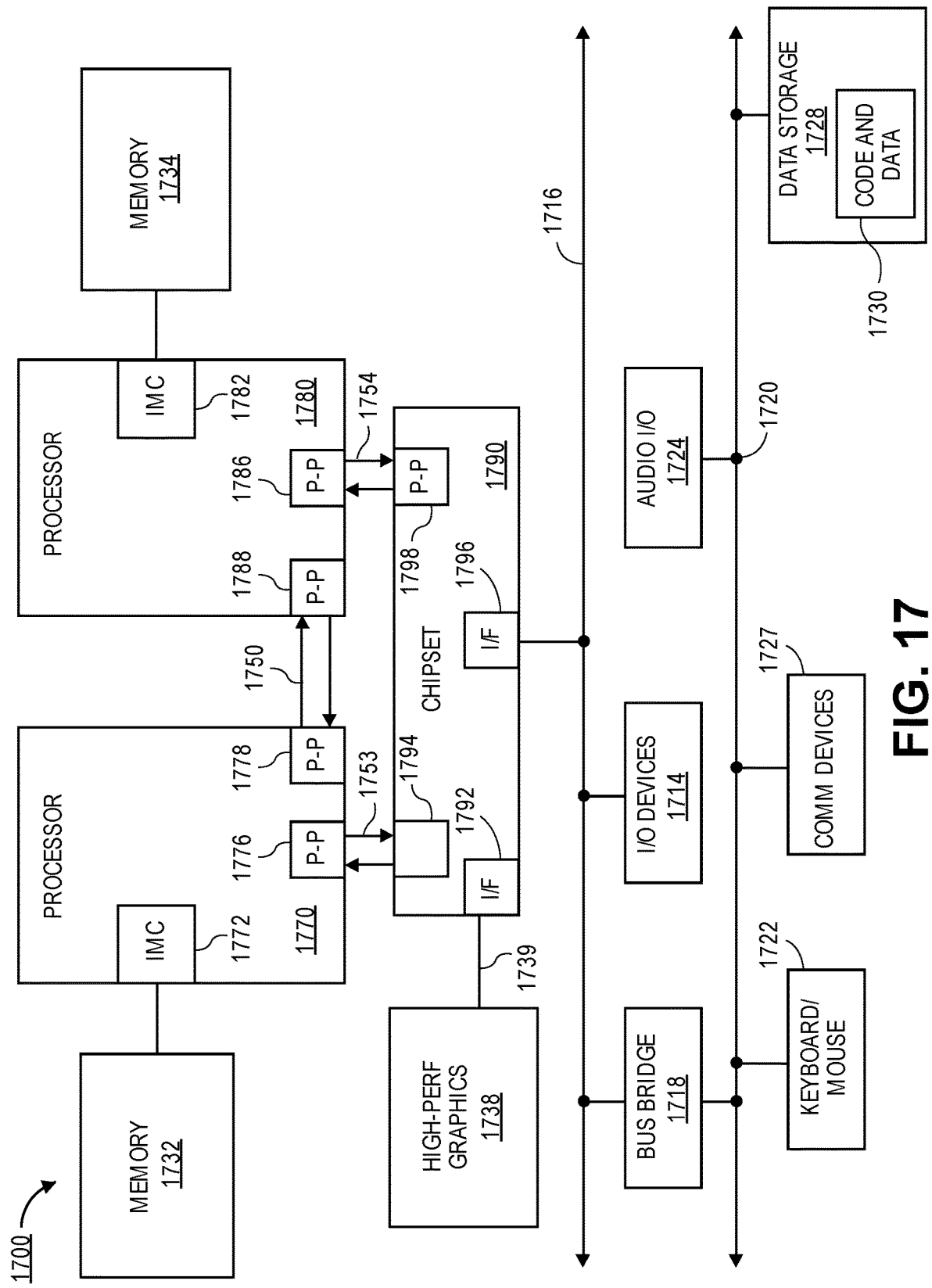
FIG. 17 illustrates another embodiment of a block diagram for a computing system.

Referring now to FIG. 17, shown is a block diagram of a second system 1700 in accordance with an embodiment of the present disclosure. As shown in FIG. 17, multiprocessor system 1700 is a point-to-point interconnect system, and includes a first processor 1770 and a second processor 1780 coupled via a point-to-point interconnect 1750. Each of processors 1770 and 1780 may be some version of a processor. In one embodiment, 1752 and 1754 are part of a serial, point-to-point coherent interconnect fabric, such as Intel's Quick Path Interconnect (QPI) architecture. As a result, embodiments of the disclosure may be implemented within the QPI architecture.

While shown with only two processors 1770, 1780, it is to be understood that the scope of the present disclosure is not so limited. In other embodiments, one or more additional processors may be present in a given processor.

Processors 1770 and 1780 are shown including integrated memory controller units 1772 and 1782, respectively. Processor 1770 also includes as part of its bus controller units point-to-point (P-P) interfaces 1776 and 1778; similarly, second processor 1780 includes P-P interfaces 1786 and 1788. Processors 1770, 1780 may exchange information via a point-to-point (P-P) interface 1750 using P-P interface circuits 1778, 1788. As shown in FIG. 17, IMCs 1772 and 1782 couple the processors to respective memories, namely a memory 1732 and a memory 1734, which may be portions of main memory locally attached to the respective processors.

Processors 1770, 1780 each exchange information with a chipset 1790 via individual P-P interfaces 1752, 1754 using point to point interface circuits 1776, 1794, 1786, 1798. Chipset 1790 also exchanges information with a high-performance graphics circuit 1738 via an interface circuit 1792 along a high-performance graphics interconnect 1739.

A shared cache (not shown) may be included in either processor or outside of both processors; yet connected with the processors via P-P interconnect, such that either or both processors' local cache information may be stored in the shared cache if a processor is placed into a low power mode.

Chipset 1790 may be coupled to a first bus 1716 via an interface 1796. In one embodiment, first bus 1716 may be a Peripheral Component Interconnect (PCI) bus, or a bus such as a PCI Express bus or another third generation I/O interconnect bus, although the scope of the present disclosure is not so limited.

As shown in FIG. 17, various I/O devices 1714 are coupled to first bus 1716, along with a bus bridge 1718 which couples first bus 1716 to a second bus 1720. In one embodiment, second bus 1720 includes a low pin count (LPC) bus. Various devices are coupled to second bus 1720 including, for example, a keyboard and/or mouse 1722, communication devices 1727 and a storage unit 1728 such as a disk drive or other mass storage device which often includes instructions/code and data 1730, in one embodiment. Further, an audio I/O 1724 is shown coupled to second bus 1720. Note that other architectures are possible, where the included components and interconnect architectures vary. For example, instead of the point-to-point architecture of FIG. 17, a system may implement a multi-drop bus or other such architecture. Embodiments may be implemented via the processors 1770, 1788, i/o devices 1714, chipset 1790, comm devices 1727 and similar components.

Embodiments (e.g., of the mechanisms) disclosed herein may be implemented in hardware (e.g., a computer programmed to perform a method may be as described in the detailed description), software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code may be executed to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. The mechanisms described herein are not limited in scope to any particular programming language. The language may be a compiled or interpreted language.

One or more aspects of at least one embodiment may be implemented by representative instructions stored on a non-transitory, machine-readable medium which represents various logic within the processor, which when read by a machine causes the machine to fabricate logic to perform the techniques described herein. Such representations, which may be generally referred to as "IP cores" may be stored on a tangible, machine readable medium and supplied to various customers or manufacturing facilities to load into the fabrication machines that make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Embodiments

The embodiments include a method for a device to participate in a managed Universal Serial Bus (USB) ecosystem. The method including establishing a connection with a plurality of devices in the ecosystem as a many-to-many relationship between extended USB device policy managers, and coordinating power and data exchange within the plurality of devices the ecosystem including at least one device that is not directly connected. The method further includes broadcasting a presence of the device to the ecosystem, coordinating with the ecosystem to select a device to be a master for the ecosystem, determining a topology of the ecosystem using broadcast information from the plurality of devices, and sending device characteristics to a master for the ecosystem. The device establishes the connection with a wireless protocol. The embodiments further includes determining a change in characteristics has occurred for the device, and sending updated device characteristics to a master for the ecosystem, querying each of the other devices in the ecosystem to determine status and capabilities, and sending a command to slave devices to configure power and data management.

The embodiments further include a non-transitory computer-readable medium, having stored therein a set of instructions, which when executed, cause a machine to perform a set of operations for a device to participate in a managed Universal Serial Bus (USB) ecosystem, where the set of operations include configuring a many-to-many relationship between an extended USB device policy manager (eDPM) of the device and each eDPM of each device in the ecosystem, and communicating power and data requirements between the eDPM and each eDPM in the ecosystem to determine power and data management policies across the ecosystem. The operations further include sending an advertisement of the device availability to the ecosystem, determining whether the device is to function as a master for the ecosystem, and receiving device characteristics information from each eDPM in the ecosystem.

The embodiments include a computing device a wireless communication device, a Universal Serial Bus controller, and a processor configured to execute an extended USB device policy manager (eDPM) of the device, eDPM to establish a many-to-many relationship with a set of eDPM in a USB ecosystem, the eDPM to establish the ecosystem via the wireless communication device and to manage power and data via the USB controller. The embodiments further include the eDPM is further configured to send an advertisement of the device availability to the ecosystem via the wireless communication device, wherein the eDPM is further configured to identify a master for the ecosystem, wherein the eDPM is further configured to create a topology of the ecosystem with received device characteristics information from each eDPM in the ecosystem, and wherein the eDPM is further configured to communicate with other eDPM in the ecosystem via the USB controller and the wireless device.

In some embodiments, a device is to participate in a managed Universal Serial Bus (USB) ecosystem. The device includes means for communicating with a plurality of other devices in the ecosystem as a one to many or a many-to-many relationship between extended USB device policy managers, and means for coordinating power and data exchange within the plurality of devices in the ecosystem including at least one device that is not directly connected. The embodiment further include means for broadcasting a presence of the device to the ecosystem, means for coordinating with the ecosystem to select a device to be a master for the ecosystem, means for determining a topology of the ecosystem using broadcast information from the plurality of devices. sending device characteristics to a master for the ecosystem, wherein the device establishes the connection with a wireless protocol, means for determining a change in characteristics has occurred for the device, means for sending updated device characteristics to a master for the ecosystem, means for querying each of the other devices in the ecosystem to determine status and capabilities, and means for sending a command to slave devices to configure power and data management.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

What is claimed is:

1. A method for a device to participate in a managed Universal Serial Bus (USB) ecosystem, the method comprising:
   receiving characteristics from a plurality of devices in the managed USB ecosystem;
   applying a distributed process in coordination with the plurality of devices in the managed USB ecosystem to select at least one device in the plurality of devices to be a master for the managed USB ecosystem;
   using the received characteristics to set a one-to-many relationship between an extended USB device policy manager and the plurality of devices; and
   coordinating power and data exchange within the plurality of devices of the managed USB ecosystem including at least one device that is not directly connected to the device.

2. The method of claim 1, further comprising:
   broadcasting a presence of the device to the ecosystem; and
   determining whether the device has a role of the master or a slave in the managed USB ecosystem.

3. The method of claim 1, wherein the master is selected based on the characteristics from the plurality of devices including power sourcing capability and computing capability of each of the plurality of devices.

4. The method of claim 1, further comprising:
   determining a topology of the ecosystem using broadcast information from the plurality of devices.

5. The method of claim 1, further comprising:
   sending device characteristics to a master for the ecosystem.

6. The method of claim 1, wherein the device establishes the connection with a wireless protocol.

7. The method of claim 1, further comprising:
   determining a change in characteristics has occurred for the device; and
   sending updated device characteristics to a master for the ecosystem.

8. The method of claim 1, further comprising:
   querying each of the other devices in the ecosystem to determine status and capabilities.

9. The method of claim 1, further comprising:
   sending command to slave devices to configure power and data management.

10. A non-transitory computer-readable medium, having stored therein a set of instructions, which when executed, cause a machine to perform a set of operations for a device to participate in a managed Universal Serial Bus (USB) ecosystem, the set of operations comprising:
    executing a distributed process in coordination with a plurality of devices in the managed USB ecosystem to select at least one device in the plurality of devices to be a master for the managed USB ecosystem;
    configuring a one-to-many relationship between an extended USB device policy manager (eDPM) of the device and each eDPM of each device in the ecosystem; and
    communicating power and data requirements between the eDPM and each eDPM in the ecosystem to determine power and data management policies across the ecosystem.

11. The non-transitory computer-readable medium of claim 10, having further instructions stored therein which when executed cause the device to perform additional operations comprising:
    sending an advertisement of the device availability to the ecosystem; and
    determining whether the device has a role of the master or a slated in the managed USB ecosystem.

12. The non-transitory computer-readable medium of claim 10, wherein the master is selected based on the characteristics from the plurality of devices including power sourcing capability and computing capability of each of the plurality of devices.

13. The non-transitory computer-readable medium of claim 10, having further instructions stored therein which when executed cause the device to perform additional operations comprising:
    receiving device characteristics information from each eDPM in the ecosystem.

14. The non-transitory computer-readable medium of claim 10, wherein the device communicates with the ecosystem via USB and a wireless protocol.

15. A computing device, comprising:
    a wireless communication device;
    a Universal Serial Bus (USB) controller; and
    a processor configured to execute an extended USB device policy manager (eDPM) of the device, the eDPM to apply a distributed process in coordination with a set of eDPM in a managed USB ecosystem to select at least one eDPM in the set of eDPM to be a master for a USB ecosystem, establish a many-to-many relationship with the set of eDPM in the USB ecosystem, the eDPM to establish the ecosystem via the wireless communication device and to establish control of the USB controller configuration via the wireless communication device.

16. The computing device of claim 15, wherein the eDPM is further configured to send an advertisement of the device availability to the ecosystem via the wireless communication device, and to determine whether the eDPM has a role of the master or a slave in the USB ecosystem.

17. The computing device of claim 15, wherein the master is selected based on the characteristics from the plurality of devices including power sourcing capability and computing capability of each of the plurality of devices.

18. The computing device of claim 15, wherein the eDPM is further configured to create a topology of the ecosystem with received device characteristics information from each eDPM in the ecosystem.

19. The computing device of claim 15, wherein the eDPM is further configured to communicate with other eDPM in the ecosystem via the USB controller and the wireless device.

* * * * *